United States Patent
Navon et al.

(10) Patent No.: US 11,561,707 B2
(45) Date of Patent: Jan. 24, 2023

(54) ALLOCATING DATA STORAGE BASED ON AGGREGATE DUPLICATE PERFORMANCE

(71) Applicant: Western Digital Technologies, Inc., San Jose, CA (US)

(72) Inventors: Ariel Navon, Revava (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/182,759

(22) Filed: Feb. 23, 2021

(65) Prior Publication Data

US 2022/0221997 A1   Jul. 14, 2022

Related U.S. Application Data

(60) Provisional application No. 63/135,047, filed on Jan. 8, 2021.

(51) Int. Cl.
G06F 3/06    (2006.01)

(52) U.S. Cl.
CPC .......... *G06F 3/0631* (2013.01); *G06F 3/0604* (2013.01); *G06F 3/0641* (2013.01); *G06F 3/0652* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,572,736 A | 11/1996 | Curran | |
| 8,732,403 B1 * | 5/2014 | Nayak | G06F 3/0619 711/170 |
| 8,849,767 B1 * | 9/2014 | Zheng | G06F 3/0683 707/664 |
| 9,678,968 B1 * | 6/2017 | Taylor | G06F 11/1435 |
| 9,715,434 B1 * | 7/2017 | Xu | G06F 3/067 |
| 10,108,543 B1 * | 10/2018 | Duggal | G06F 11/1453 |
| 10,108,544 B1 * | 10/2018 | Duggal | G06F 11/14 |
| 10,747,447 B1 * | 8/2020 | Patwardhan | G06F 3/0608 |
| 10,795,812 B1 * | 10/2020 | Duggal | G06F 3/067 |
| 10,817,475 B1 | 10/2020 | Faibish et al. | |

(Continued)

OTHER PUBLICATIONS

Waraporn Leesakul et al., "Dynamic Data Deduplication in Cloud Storage", Apr. 2014, IEEE 8th International Symposium on Service Oriented System Engineering, pp. 1-7, https://eprints.whiterose.ac.uk/94869/1/wara.pdf (Year: 2014).*

(Continued)

*Primary Examiner* — Christopher D Birkhimer
(74) *Attorney, Agent, or Firm* — Patent Law Works LLP

(57) ABSTRACT

Systems and methods for allocating storage based on aggregate performance of duplicate data are described. A number of duplicates of a host data unit in a storage medium may be determined, such as by a storage device and/or host device. Operation parameters for the duplicate host data may be aggregated into aggregate operation parameters. The aggregate operation parameters may be used to allocate storage in the storage medium, such as by determining target duplicate numbers and performance thresholds for deduplication and tiering decisions. Duplicate host data units may be stored, moved, or deleted based on the aggregate operation parameters.

20 Claims, 8 Drawing Sheets

(56) References Cited

U.S. PATENT DOCUMENTS

| | | | |
|---|---|---|---|
| 2007/0050584 A1 | 3/2007 | Asauchi | |
| 2008/0144079 A1* | 6/2008 | Pandey | H03M 7/30 |
| | | | 358/1.15 |
| 2010/0077013 A1* | 3/2010 | Clements | G06F 16/1748 |
| | | | 707/822 |
| 2010/0088296 A1* | 4/2010 | Periyagaram | G06F 16/183 |
| | | | 707/E17.014 |
| 2010/0174881 A1* | 7/2010 | Anglin | G06F 11/1453 |
| | | | 711/E12.103 |
| 2010/0281081 A1* | 11/2010 | Stager | G06F 9/5022 |
| | | | 707/814 |
| 2010/0333116 A1* | 12/2010 | Prahlad | G06F 3/067 |
| | | | 713/153 |
| 2011/0246741 A1 | 10/2011 | Raymond et al. | |
| 2013/0151756 A1* | 6/2013 | Tofano | G06F 3/0679 |
| | | | 711/E12.008 |
| 2013/0318288 A1 | 11/2013 | Khan et al. | |
| 2015/0205816 A1* | 7/2015 | Periyagaram | G06F 11/1453 |
| | | | 707/827 |
| 2015/0261776 A1* | 9/2015 | Attarde | G06F 16/1748 |
| | | | 707/664 |
| 2016/0350324 A1* | 12/2016 | Wang | G06F 16/137 |
| 2017/0149451 A1 | 5/2017 | Shany et al. | |
| 2018/0121108 A1* | 5/2018 | Dain | G06F 3/0619 |
| 2018/0267733 A1 | 9/2018 | Xie et al. | |
| 2018/0314727 A1* | 11/2018 | Epstein | G06N 5/003 |
| 2019/0129972 A1 | 5/2019 | Borate et al. | |
| 2019/0179556 A1* | 6/2019 | Kanai | G06F 3/0641 |
| 2020/0301593 A1* | 9/2020 | Vaithianathan | G06F 3/0673 |
| 2020/0310686 A1* | 10/2020 | Truong | G06F 3/067 |
| 2020/0409908 A1* | 12/2020 | Ahn | G06F 3/0607 |
| 2021/0374021 A1* | 12/2021 | Santhakumar | G06F 11/3485 |

OTHER PUBLICATIONS

Zhichao Yan, "SES-Dedup: a Case for Low-Cost ECC-based SSD Deduplication", 2019, 35th Symposium on Mass Storage Systems and Technologies, pp. 292-298, https://ieeexplore.ieee.org/stamp/stamp.jsp?tp=&arnumber=8890081 (Year: 2019).*

David Geer, "Reducing the Storage Burden via Data Deduplication", Industry Trends, Dec. 2008, pp. 15-17, https://ieeexplore.ieee.org/stamp/stamp.jsp?tp=&arnumber=4712493 (Year: 2008).*

Hong, B., et al., Duplicate Data Elimination in a SAN File System, 2004, p. 301-314.

* cited by examiner

ALLOCATING DATA STORAGE BASED ON AGGREGATE DUPLICATE PERFORMANCE

TECHNICAL FIELD

The present disclosure generally relates to management of duplicate data in storage devices and, more particularly, to dynamically allocating storage based on duplicate data.

BACKGROUND

Storage devices, such as disk drives (solid-state drives, hard disk drives, hybrid drives, tape drives, etc.), universal serial bus (USB) flash drives, secure digital (SD) cards and SD extended capacity (SDXC) cards, and other form factors, may be used for storing data on behalf of a host, host system, or host device. These storage devices may include integrated storage devices built into the enclosure of the host device, removable storage devices mating with the host device through a physical interface connector (directly or through an interface cable), and network storage devices communicating with the host device using network protocols over a wired or wireless network connection. Some removable storage devices and/or network storage devices may use short range wireless communication, such as Bluetooth, ultra-wideband (UWB), Wi-Fi, Zigbee, etc., for communication with a host device or network. Storage devices may be integrated into storage systems that vary from single storage devices directly supporting a host device through a peripheral storage interface to multi-device storage systems (often supporting multiple host systems) that include multiple storage devices arranged in an array of drives interconnected by a common communication fabric and, in many cases, controlled by a storage controller, redundant array of independent disks (RAID) controller, or general controller, for coordinating storage and system activities across the array of drives.

Host data stored to one or more storage devices may result in duplicate copies. In some systems, duplicate copies may be desirable, up to a point. For example, duplicate copies may be stored for data protection and redundancy policies to prevent data loss in the event that a copy is lost or corrupted and/or duplicate copies may be stored to support multiple users and/or instances of applications using the data. Storage systems may be configured to intentionally store and maintain multiple copies of image data, audio files, video files, databases, and other data units, files, or objects, but may still result in the creation and storage of unwanted duplicates that unnecessarily use storage resources. Storage systems may include a deduplication function for identifying duplicate data and reducing the number of copies to a desirable level, whether one or more. In addition, storage systems may support data caching and/or tiered storage policies in systems maintaining multiple copies.

In some storage systems, deduplication, replication, data caching, and data tiering may be managed based on a duplicate policy that sets a fixed number of copies to be maintained by the system. For example, a host device or storage controller may maintain a count of duplicate data and attempt to keep the count at a fixed number, regardless of the runtime usage of the copies. Deduplication and/or replication decisions may be based on achieving this fixed target number. Similarly, data caching and/or data tiering may be based on hot data definitions that treat each copy separately and determine whether that copy should be cached or stored in fast or slow storage, based solely on the access frequency of that copy.

A more responsive duplicate copy management process for storage devices that dynamically determines and maintains the number and location of copies may be advantageous. Efficient systems and methods of allocating copies of host data to balance performance and storage space utilization may be needed.

SUMMARY

Various aspects for allocating data storage based on aggregate duplicate performance, particularly aggregating operation parameters across duplicates for duplicate management and performance tiering, are described.

One general aspect includes a system that includes a controller, including a processor and a memory, and configured to: determine a plurality of duplicate data units corresponding to a target data unit in a plurality of storage media; determine a duplicate count of the plurality of duplicate data units; aggregate at least one operation parameter for the plurality of duplicate data units to determine at least one aggregate operation parameter; and allocate, based on the duplicate count and the at least one aggregate operation parameter, a storage operation for the target data unit to a storage location in the plurality of storage media.

Implementations may include one or more of the following features. The controller may be further configured to: determine, based on the at least one aggregate operation parameter, a duplicate target number; and initiate, responsive to the duplicate count exceeding the duplicate target number, a delete operation targeting at least one duplicate data unit from the plurality of duplicate data units. The at least one aggregate operation parameter may include a plurality of aggregate operation parameters; the plurality of aggregate operation parameters may include aggregate operation parameters selected from a number of users of the plurality of duplicate data units, a number of read operations targeting the plurality of duplicate data units in a performance period, a number of write operations for the plurality of duplicate data units in the performance period, and a latency value for storage operations targeting the plurality of duplicate data units in the performance period; and the controller may by further configured to determine the plurality of aggregate operation parameters. The duplicate target number may be further based on a protection level assigned to the target data unit from a plurality of protection levels and the controller may be further configured to determine the protection level assigned to the target data unit. The duplicate target number may be further based on a comparison of a size of the target data unit and at least one size threshold, and the controller may be further configured to determine the size of the target data unit and determine the at least one size threshold. The system may include a storage device and the storage device may include the controller and the plurality of storage media, and the controller may be further configured to: scan the plurality of storage media to determine the plurality of duplicates; and execute the delete operation targeting at least one duplicate data unit from the plurality of duplicate data units. The controller may be further configured to: encode, using an error correction code, host data units stored in the plurality of storage media; compare an encoded target data unit corresponding to the target data unit to a plurality of encoded comparison data units from the plurality of storage media; and determine, based on the comparison of the encoded target data unit and the plurality of encoded comparison data units, the plurality of duplicates and the duplicate count. The plurality of storage media may include a fast storage media device and a slow storage media device, the fast storage media device having a greater storage operation per unit time value than the slow storage media device. The controller may be further configured to: determine, based on the duplicate count and the at least one aggregate operation parameter, an operation score for the target data unit; compare the operation score to a performance threshold; target, based on the operation score meeting the performance threshold, at least one duplicate data unit in the slow storage media device for the delete operation; and target, based on the operation score not meeting the performance threshold, at least one duplicate data unit in the fast storage media device for the delete operation. The controller may be further configured to: determine, based on the duplicate count and the at least one aggregate operation parameter, an operation score for the target data unit; compare the operation score to a performance threshold; determine, based on the operation score meeting the performance threshold, the storage location in the fast storage media device for the storage operation; and determine, based on the operation score not meeting the performance threshold, the storage location in the slow storage media device for the storage operation. The at least one aggregate operation parameter may include a plurality of aggregate operation parameters; the plurality of aggregate operation parameters may include aggregate operation parameters selected from a number of users of the plurality of duplicate data units, a number of read operations targeting the plurality of duplicate data units in a performance period, and a number of write operations for the plurality of duplicate data units in the performance period; and the controller may be further configured to determine the plurality of aggregate operation parameters. The system may include: a host device that includes the controller; a first storage device that includes the fast storage media device; and a second storage device that includes the slow storage media device.

Another general aspect includes a computer-implemented method that includes: determining a plurality of duplicate data units corresponding to a target data unit in a plurality of storage media; determining a duplicate count of the plurality of duplicate data units; aggregating at least one operation parameter for the plurality of duplicate data units to determine at least one aggregate operation parameter; and allocating, based on the duplicate count and the at least one aggregate operation parameter, a storage operation for the target data unit to a storage location in the plurality of storage media.

Implementations may include one or more of the following features. The computer-implemented method may include: determining, based on the at least one aggregate operation parameter, a duplicate target number; and initiating, responsive to the duplicate count exceeding the duplicate target number, a delete operation targeting at least one duplicate data unit from the plurality of duplicate data units. The computer-implemented method may include determining a plurality of aggregate operation parameters, where: the at least one aggregate operation parameter includes the plurality of aggregate operation parameters; and the plurality of aggregate operation parameters includes aggregate operation parameters selected from a number of users of the plurality of duplicate data units, a number of read operations targeting the plurality of duplicate data units in a performance period, a number of write operations for the plurality of duplicate data units in the performance period, and a latency value for storage operations targeting the plurality of duplicate data units in the performance period. The computer-implemented method may include determining a protection level assigned to the target data unit from a plurality of protection levels, the duplicate target number further based on the protection level. The computer-implemented method may include: determining the size of the target date unit; and determining at least one size thresholds, where the duplicate target number is further based on a comparison of the size of the target data unit and the at least one size threshold. The computer-implemented method may include: determining, based on the duplicate count and the at least one aggregate operation parameter, an operation score for the target data unit; the plurality of storage media includes: comparing the operation score to a performance threshold, where the plurality of storage media includes a fast storage media device and a slow storage media device, the fast storage media device having a greater storage operation per unit time value than the slow storage media device; targeting, based on the operation score meeting the performance threshold, at least one duplicate data unit in the slow storage media device for the delete operation; and targeting, based on the operation score not meeting the performance threshold, at least one duplicate data unit in the fast storage media device for the delete operation. The computer-implemented method may include: determining, based on the duplicate count and the at least one aggregate operation parameter, an operation score for the target data unit; comparing the operation score to a performance threshold, where the plurality of storage media includes a fast storage media device and a slow storage media device, the fast storage media device having a greater storage operation per unit time value than the slow storage media device; determining, based on the operation score meeting the performance threshold, the storage location in the fast storage media device for the storage operation; and determining, based on the operation score not meeting the performance threshold, the storage location in the slow storage media device for the storage operation. The computer-implemented method may include determining a plurality of aggregate operation parameters, where the at least one aggregate operation parameter includes the plurality of aggregate operation parameters and the plurality of aggregate operation parameters includes aggregate operation parameters selected from: a number of users of the plurality of duplicate data units; a number of read operations targeting the plurality of duplicate data units in a performance period; and a number of write operations for the plurality of duplicate data units in the performance period.

Still another general aspect includes a storage device that includes: a storage medium configured to store host data; a storage device controller including a processor and an operating memory; means for determining a plurality of duplicate data units corresponding to a target data unit in a plurality of storage media; means for determining a duplicate count of the plurality of duplicate data units; means for aggregating at least one operation parameter for the plurality of duplicate data units to determine at least one aggregate operation parameter; means for determining, based on the at least one aggregate operation parameter, a duplicate target number; and means for initiating, responsive to the duplicate count exceeding the duplicate target number, a delete operation targeting at least one duplicate data unit from the plurality of duplicate data units.

The various embodiments advantageously apply the teachings of storage devices and/or storage systems to improve the functionality of such computer systems. The various embodiments include operations to overcome or at least reduce the issues previously encountered in storage systems and, accordingly, are more efficient and/or cost-effective than other computing systems. That is, the various embodiments disclosed herein include hardware and/or software with functionality to improve management of duplicate host data stored in a storage device, such as by aggregating operation parameters across duplicates for determining the number of duplicates maintained and which performance tiers they are stored in. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
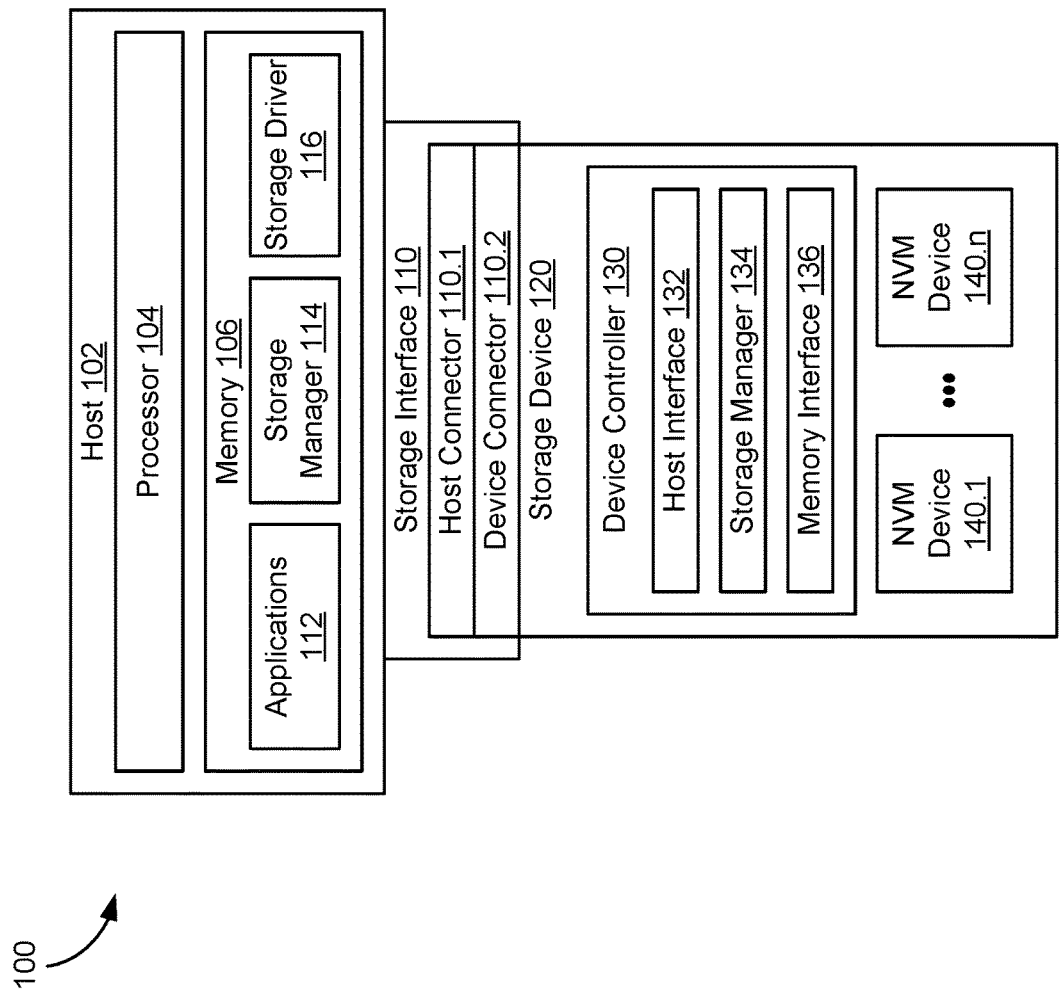
FIG. 1 schematically illustrates a storage system with host device and a storage device.

FIG. 1 shows an embodiment of an example data storage system 100 with a data storage device 120 interconnected by a storage interface 110 to host device 102. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, disk drives, or drives) in communication with one or more host devices 102. In some embodiments, host device 102 may be a user device with an embedded computing system, such as video camera, mobile phone, tablet computer, smart television, smart appliance, portable game device, printer, or other consumer electronic device. In some embodiments, storage device 120 may be a removable storage device, such as a universal serial bus (USB) flash drive, secure digital (SD) card, extended capacity (SDXC) SD card, or other removable storage device.

In some embodiments, storage device 120 may be configured in a server, storage array blade, or similar storage unit as a standalone appliance or for use in data center storage racks or chassis. Storage device 120 may be one of a plurality of storage devices, such as hard disk drives (HDDs), solid state drives (SSDs), hybrid drives, etc., installed in a server, storage node, or storage array. Storage device 120 may interface with one or more host devices 102 and provide data storage and retrieval capabilities for or through those host systems. In some embodiments, host device 102 may support one or more client systems or devices configured to access data in or about storage device 120. For example, clients may include one or more applications that access data from storage device 120 through host device 102 and/or through a network or network fabric. In some embodiments, storage device 120 may be configured in a storage hierarchy that includes storage nodes, storage controllers, and/or other intermediate components between storage device 120 and host device 102. For example, each storage controller may be responsible for a corresponding set of storage nodes and their respective storage devices connected through a corresponding backplane network and/or network fabric, though only storage device 120 and host device 102 are shown.

In the embodiment shown, storage device 120 is attached to storage interface 110 for host communication with host device 102. For example, host device 102 may include a host connector 110.1, such as a peripheral component interface express (PCIe) connector, USB slot, memory card slot/reader (for Memory Stick, MultiMedia Card, SD, SDXC, etc. memory cards), etc., that provides a physical connector configured to mate with a corresponding storage device connector 110.2. In some embodiments, host connector 110.1 may define a slot or port providing a wired internal connection to a host bus or storage interface controller. In some embodiments, device connector 110.2 may include a portion of a storage device housing or projection therefrom that removably inserts into the slot or port in host connector 110.1 to provide a physical attachment and electrical connection for host-device communication. In some embodiments, an intervening wire, extender, switch, or similar device compatible with host connector 110.1 and device connector 110.2 may be inserted between host connector 110.1 and device connector 110.2 without materially changing the host-device interface or operation of storage interface 110.

In some embodiments, storage interface 110 may be configured to use network communication protocols. Host connector 110.1 and device connector 110.2 may include any type of physical connector compatible with one or more network and/or internet protocols. For example, host connector 110.1 and device connector 110.2 may include ethernet, PCIe, Fibre Channel, small computer serial interface (SCSI), serial attached SCSI (SAS), or another network-capable interface. In some embodiments, storage device 120 may communicate through a backplane network, network switch(es), and/or other hardware and software components accessed through storage interface 110 for reaching host device 102. For example, storage interface 110 may include or interconnect with a plurality of physical port connections and intermediate components that define physical, transport, and other logical channels for establishing communication with the different components and subcomponents for establishing a communication channel between host device 102 and storage device 120. In some embodiments, storage interface 110 may provide a primary host interface for storage device management and host data transfer, as well as a control interface that includes limited connectivity to the host for low-level control functions, such as through a baseboard management controller (BMC).

In some embodiments, data storage device 120 is, or includes, a solid-state memory device. Data storage device may include a non-volatile memory (NVM) or storage device controller 130 based on compute resources (processor and memory) and a plurality of NVM or media devices 140 for data storage (e.g., one or more NVM device(s), such as one or more flash memory devices). In some embodiments, storage device controller 130 may include a host interface controller 132, a storage manager 134, and one or more memory interface controllers 136. For example, host interface controller 132 may include a physical subsystem, such as an application specific integrated circuit (ASIC) or system on a chip (SOC), and/or logic or firmware running on the general compute resources of storage device controller 130 for configuring and controlling communication with host device 102 over storage interface 110. Storage manager 134 may include configuration, background, and storage processing operations running on the general compute resources of storage device controller 130 to coordinate operation of storage device 120, host interface 132, and memory interface 136. Memory interface 136 may include a physical memory bus and related resources for connecting to media devices 140.1-140.n, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors, such as device connector 110.2, for interconnecting with storage interface 110.

In some embodiments, data storage device 120 may include a single medium device while in other embodiments data storage device 120 includes a plurality of media devices. In some embodiments, media devices 140 may include NAND-type flash memory or NOR-type flash memory. In some embodiments, data storage device 120 may include one or more HDDs, hybrid drives, tape drives, or other storage device types and corresponding media devices 140. In some embodiments, data storage device 120 may include a flash memory device, which in turn includes one or more flash memory die, one or more flash memory packages, one or more flash memory channels, or the like. However, in some embodiments, data storage device 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage device 120 includes storage device controller 130, which includes one or more processing units (also sometimes called central processing units (CPUs) or processors or microprocessors or microcontrollers) configured to execute instructions in one or more programs. In some embodiments, the one or more processors are shared by one or more components within, and in some cases, beyond the function of the device controller. Media devices 140 may be coupled to device controller 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage device 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations in storage device 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, logical and/or physical zones may be assigned within storage device 120 as groups of data blocks allocated for specified host data management purposes.

In some embodiments, host, host system, or host device 102 may be coupled to data storage system 100 through a network interface that is part of host fabric network that includes storage interface 110 as a host fabric interface. In some embodiments, multiple host devices 102 (only one of which is shown in FIG. 1) and/or clients are coupled to data storage system 100 through the fabric network, which may include a storage network interface or other interface capable of supporting communications with multiple host systems. In some embodiments, the fabric network may operate over a wired and/or wireless network (e.g., public and/or private computer networks in any number and/or configuration) which may be coupled in a suitable way for transferring data. For example, the network may include any means of a conventional data communication network such as a local area network (LAN), a wide area network (WAN), a telephone network, such as the public switched telephone network (PSTN), an intranet, the internet, or any other suitable communication network or combination of communication networks.

Host device 102 may be any suitable computer device, such as a computer, a computer server, a laptop computer, a tablet device, a netbook, an internet kiosk, a personal digital assistant, a mobile phone, a smart phone, a gaming device, a smart appliance, a camera or video camera, consumer electronics device, or any other computing device. Host device 102 is sometimes called a host, client, or client system, depending on respective roles, configurations, and contexts. In some embodiments, host device 102 is distinct from a storage controller, storage node, or storage interface component housing or receiving storage device 120. In some embodiments, host device 102 may be any computing device configured to store and access data in storage device 120.

Host device 102 may include one or more central processing units (CPUs) or processors 104 for executing compute operations or instructions for accessing storage devices 120 through storage interface 110. In some embodiments, processor 104 may be associated with operating memory 106 for executing both storage operations and a storage interface protocol compatible with storage interface 110 and storage device 120. In some embodiments, a separate storage interface unit (not shown) may provide the storage interface protocol and related processor and memory resources. From the perspective of storage device 120, storage interface 110 may be referred to as a host interface and provides a host data path between storage device 120 and host device 102.

Host device 102 may include memory 106 configured to support various data access and management functions, generally in support of one or more applications 112. Memory 106 may include a random access memory (RAM) or another type of dynamic storage device that stores information and instructions for execution by processor 104 and/or a read only memory (ROM) or another type of static storage device that stores static information and instructions for use by processor 104 and/or any suitable storage element such as a hard disk or a solid state storage element. For example, memory 106 may include one or more dynamic random access memory (DRAM) devices for use by host device 102 for command, management parameter, and/or host data storage and transfer to and from storage device 120. In some embodiments, storage devices 120 may be configured for direct memory access (DMA), such as using remote direct memory access (RDMA) protocols, over storage interface 110 to interact with host device 102.

In some embodiments, host device 102 may include one or more applications 112 instantiated in host memory 106 for execution by host processor 104. Applications 112 may include and/or be configured to access one or more storage management functions of storage manager 114. Storage manager 114 may include applications, services, libraries, and/or corresponding interfaces for managing the contents and operation of storage device 120 on behalf of host device 102. For example, storage manager 114 may include services for monitoring storage device parameters, such as total capacity, capacity used, and capacity available, tracking storage device input/output (I/O) history, performance, and workload, and initiating host storage maintenance functions, such as deduplication, data tiering, media scans, defragmentation, host data transfer or reorganization, etc.

In some embodiments, storage manager 114 may configure and manage storage device 120 for duplicate management, such as in-device deduplication operations, shared deduplication operations, and/or data tiering of duplicate host data. In some embodiments, storage device 120 may identify duplicates using a first similarity criteria and selectively forward those duplicates to host device 102 to determine actionable duplicates using a second similarity criteria. Once duplicates have been determined, storage manager 114 may aggregate or receive aggregated operation parameters for the set of duplicates for a host data unit. The aggregate operation parameters may be used to manage the set of duplicates, such as determining their target number (and initiating deduplication or replication) and/or an operation score for allocating the duplicate data units among performance tiers. For example, storage device 120 may include fast and slow media devices and/or host device 102 may be supported by multiple storage devices having different performance characteristics. In some embodiments, storage manager 114 may include a duplicate checking or verification logic, duplicate management logic, performance monitoring logic, deduplication logic, and/or performance allocation logic, and corresponding command sets for interacting with storage device 120.

Storage manager 114 may include and/or be configured to access a storage driver 116 configured to manage communications with storage device 120 in accordance with a defined storage protocol supported by storage interface 110 and host and storage device configuration parameters. In some embodiments, storage driver 116 may be an operating system and/or firmware service or set of services configured to initialize, control, and manage communication through storage interface 110 to storage device 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
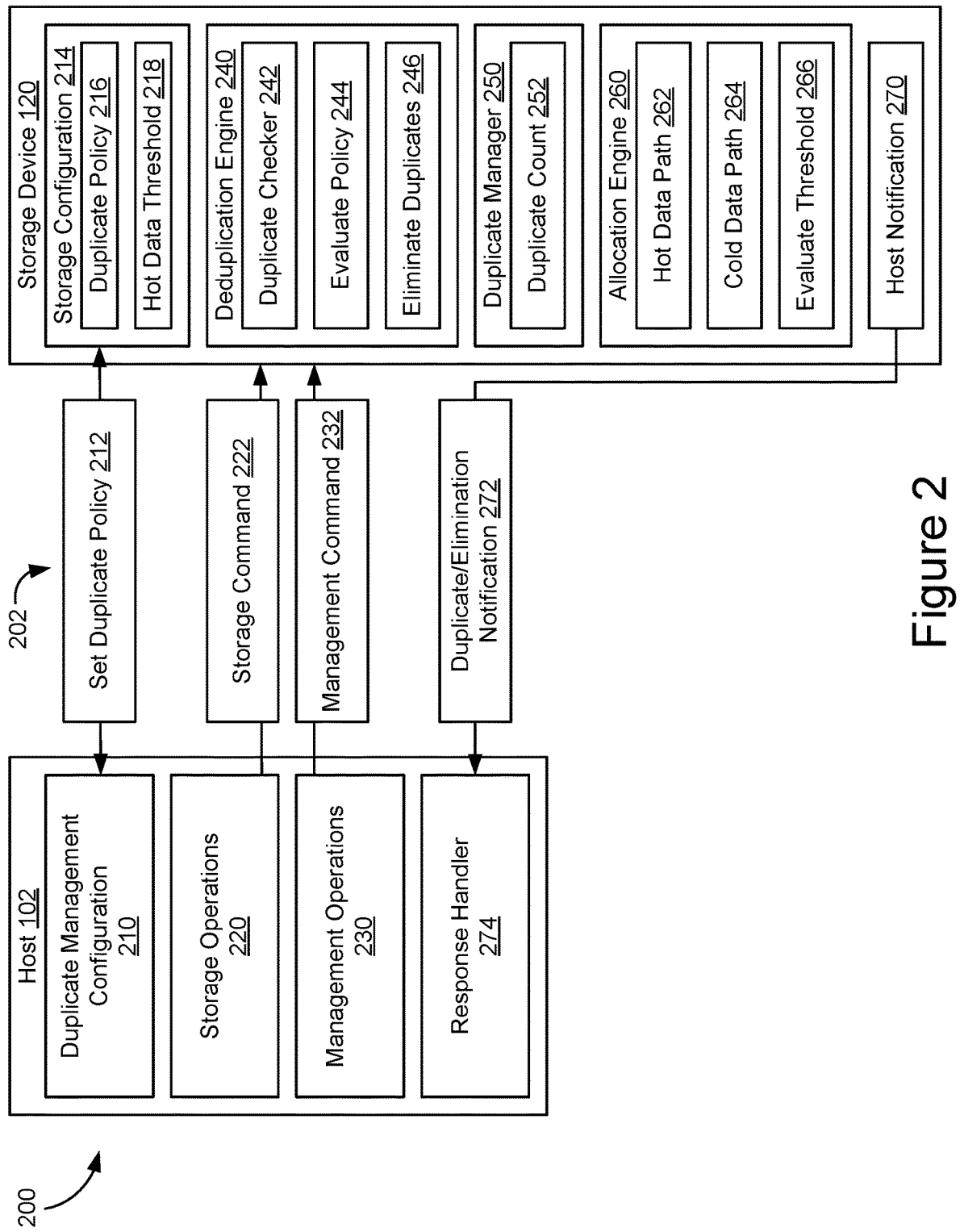
FIG. 2 schematically illustrates a duplicate management process that may be used by the storage system of FIG. 1.

FIG. 2 shows a schematic representation of a host/storage interface for duplicate management that may be used by a storage system 200 configured similarly to storage system 100 of FIG. 1. Host device 102 may be configured for communication with storage device 120, such as through a storage interface similar to storage interface 110 in FIG. 1. In some embodiments, communications 202 may include messages passed between host device 102 and storage device 120. For example, host device 102 and storage device 120 may support bi-directional packetized communication using a master-slave or multi-master configuration over a communication bus or network connection between them. In some embodiments, communications 202 between host 102 and storage device 120 may include register-based communication controlled solely by host device 102. For example, the interface between storage device 120 and host device 102 may define a set of memory locations in storage device 120 that are accessible to host device 102, such as function registers and/or data buffers of an SD card interface or a command and/or data buffer configured for RDMA access. Host device 120 may read storage device memory locations to receive feature support information, data transfers, and/or duplicate and/or removal notifications. Host device 120 may write to storage device memory locations to set configuration parameters and/or initiate deduplication operations through storage commands or deduplication commands.

In some embodiments, host device 102 and storage device 120 may include duplicate configuration parameters, such as duplicate management configuration 210 and storage configuration 214. For example, duplicate management configuration 210 may include configuration parameters for enabling replication, deduplication, and/or data tiering and determining whether those features are enabled for storage operations, such as write operations and/or read operations, and/or specific management commands.

Host device 102 and/or storage device 120 may define a default deduplication configuration. For example, host device 102 may be configured to manage all deduplication at the host level, requesting decoded host data from storage device 120 for deduplication operations, as a default configuration. Host device 102, by interrogating deduplication support parameters in storage device 120, may determine that storage device 120 supports in-device deduplication based on encoded host data to provide at least a first layer of duplicate detection. Responsive to host device 102 determining what deduplication is supported by storage device 120, host device 102 may set duplicate policy 212 using a corresponding configuration parameter in duplicate management configuration 210 and/or storage configuration 214. In some embodiments, storage device 120 may include a set of replication configuration parameters, deduplication configuration parameters, and/or duplicate data tiering parameters in duplicate policy 216. For example, deduplication parameter may determine whether deduplication operations are initiated as a background or idle operation by storage device 120 (based on background/idle operation resources and priorities), executed as part of all read and write operations or only host storage operations including a deduplication parameter, or responsive to a defined deduplication command from host device 102.

In some embodiments, duplicate management configuration 210 and/or storage configuration 214 may include duplicate management rules and/or duplicate policy 216 to determine the number of duplicates that may be acceptable and where those duplicates should be stores. For example, a simple duplicate policy 216 may define a number of acceptable copies, such as 1 if only unique data units are retained or another integer value if more copies are acceptable. In some embodiments, a dynamic duplicate policy 216 may use a deduplication rule set based on aggregate operation parameters for the duplicate data units to determine the number of acceptable duplicates for each host data unit based on use or other parameters.

In some embodiments, duplicate management configuration 210 and/or storage configuration 214 may include data storage tiers based on matching data units meeting different performance thresholds with storage media locations that support better or worse performance. For example, storage device 120 may include multiple types of non-volatile memory devices, such as fast storage media devices based on single level cells (SLC) and slow storage media devices based on multiple level cell (MLC). Storage configuration 214 may include one or more performance thresholds, such as a hot data threshold 218 configured to identify data units with a higher frequency of use (hot data) and distinguish them from data units with a lower frequency of use (cold data). In a default configuration, hot data threshold 218 may be defined using a fixed value or dynamic algorithm for determining the allocation of a particular data unit based on the operation score of that data unit. For example, an operation score may be calculated for each host data unit and compared against hot data threshold 218 to determine whether the host data unit should be allocated as a hot data unit or a cold data unit. Storage configuration 214 and/or duplicate policy 216 may enable duplicate data units to use a set of aggregate operation parameters to determine a duplicate operation score that may be used for all duplicates corresponding to that host data unit and use that duplicate operation score for allocation of duplicate data units, as well as contributing to other duplicate management rules.

In some embodiments, host device 102 may use storage operations 220, such as host data read and/or write operations, to initiate a duplicate management operations. For example, host device 102 may send a storage command 222 to storage device 120 specifying a target host data unit to read or write. Storage device 120 may be configured to perform deduplication for all write and/or read operations or selectively based on a deduplication parameter that may be included with storage command 222. For example, the target host data unit of the read or write operation may be used as a deduplication target and storage device 120 may scan for duplicates of the target host data unit before completing the storage operation specified in storage command 222. In some embodiments, host device 102 may use management operations 230, such as a dedicated command for performing host data deduplication, to initiate a storage device deduplication operation. For example, host device 102 may send a management command 232 to storage device 120 specifying the scope of a deduplication operation to be initiated by storage device 120. In some embodiments, management command 232 may initiate a process of systematically scanning all host data on storage device 120 or a defined subset of that host data to determine one or more host data units that are duplicated. For example, a duplicate check command may initiate a duplicate checking function of storage device 120 and return a number of duplicates for a host data unit. As another example, a deduplication command may conduct the duplicate check and reduce the number of duplications in accordance with deduplication rules of duplicate policy 216. One or more parameters defining the selection of target data units to be deduplicated may be included with management command 232 and/or stored in storage configuration 214.

Storage device 120 may invoke deduplication engine 240 for executing one or more deduplication operations for a selected target data unit. In some embodiments, deduplication engine 240 may include duplicate checker 242 configured to read or otherwise determine a target data unit and scan encoded host data to find one or more duplicates. For example, deduplication engine 240 may compare the encoded target data unit against a plurality of encoded comparison data units to determine similarity values and determine duplicates based on comparing the similarity values to a similarity threshold. In some embodiments, deduplication engine 240 may be configured to use a bit-by-bit comparison of the encoded data units to determine the similarity score based on the number of bits that do not match. For example, duplication engine 240 may use an exclusive-or (XOR) logic that returns a value of 1 for each pair of bits that are not equal and a 0 for pairs that are equal, then sums those returned values across all bits in the encoded data units being compared. In some embodiments, storage device 120 may leverage latch logic within the memory controller of storage device 120 to efficiently process the bit-by-bit comparisons in close proximity to the NVM media that stores the encoded host data.

For example, deduplication engine 240 may read and/or encode the target host data into latch layer 1 of storage device 120. If the target host data is received from host device 102 to initiate the deduplication operation it may need to be encoded using storage device error correction codes (ECC) prior to being placed in a first side of a latch register. If the target host data is read from the NVM media in the storage device it may be ECC encoded as it comes out of the media and can be read directly into the first side of the latch register.

Deduplication engine 240 may then scan encoded data with duplicate checker 242. For example, host data selected for comparison may be read into latch layer 2 of storage device 120. Duplicate checker 242 may include logic for determining the selection of encoded comparison data units, such as using host metadata to select data units of similar size, type, etc. and may iterate through each encoded comparison data unit selected. For example, each encoded comparison data unit may be read into latch layer 2 and compared while the encoded target data unit remains in latch layer 1. In some embodiments, a bit-by-bit XOR comparison of the latches may be executed against the paired bits between latch layer 1 and latch layer 2. Each bit comparison may generate a count of unequal or different bits that may be summed to determine similarity value. In some embodiments, determining the similarity value may include a more complex evaluation of bit differences, such as characterization of bit difference patterns, bit differences as a percentage of total bits in the data unit, etc, to determine the similarity value. In some embodiments, a similarity value calculation algorithm may be included in duplicate policy 216.

Duplicate checker 242 may compare the similarity value to a similarity threshold to determine whether the compared data units are similar enough to be considered duplicates. The similarity threshold may be determined to allow for bit differences at least reflective of the bit errors the ECC encoding would correct for the data units. For example, the similarity threshold may be based on an expected bit error rate associated with the media storing the host data units. Additional allowable similarity value differences for determining duplicates, such as anticipated differences based on data formats, metadata tagging, etc., may also be used to determine the similarity threshold. Encoded comparison data units with similarity values exceeding the similarity threshold may be determined different and encoded comparison data units with similarity values less than or meeting the similarity threshold may be considered duplicates or potential duplicates.

Deduplication engine 240 may include further logic to collect and classify duplicates or potential duplicates from the initial scan of encoded data to determine a final set of duplicates to be returned by duplicate checker 242. For example, a number of potential duplicates under the similarity threshold may be further evaluated based on hash evaluation, metadata evaluation, cross-comparison, or other secondary duplicate analysis to determine one or more duplicates for processing according to duplicate policy 216. Duplicate checker 242 may be configured to return a set of duplicate data units as the data units themselves or a list of LBAs or other identifiers for the set of duplicate data units. In some embodiments, duplicate checker 242 may return the duplicate data units to host device 102 using host notification 270.

In some embodiments, deduplication engine 240 may be configured to evaluate duplicate policy 216, eliminate extra duplicates 246 and notify the host 270 responsive to duplicate checker 242. For example, duplicate policy 216 may allow only a single copy and all determined duplicates may be deleted using in-device delete operations until a single copy remains or a write operation for a new copy may be discarded rather than being processed. In some embodiments, duplicate policy 216 may determine a dynamic model for determining the target number of duplicates and determination of the target number may be part of evaluate policy 244. For example, evaluate policy 244 may determine the target number based on aggregate operation parameters across the set of duplicates and compare that target number to the count of duplicate data units returned by duplicate checker 242. In some embodiments, evaluate policy 244 may return a confirmation that the number of duplicates is within an acceptable policy target number or an elimination number of duplicate data units that are not required and/or permitted under the policy (generally a difference between the target number and the count of the duplicates in the duplicate set). In some embodiments, deduplication engine 240 may eliminate duplicates 246 to reduce the number of duplicates to the target number. For example, eliminate duplicates 246 may generate delete operations to target a selected subset of the duplicate set. In some embodiments, the LBAs of the deleted duplicates may be mapped to the remaining copy by storage device 120.

Storage device 120 may include a duplicate manager 250 configured to determine, access, and/or store parameters related to duplicate data units. For example, duplicate manager 250 may receive a set of duplicate identifiers for duplicate sets of host data units from deduplication engine 240 and/or duplicate checker 242. Duplicate manager 250 may be configured to store identifiers for the data units, such as host LBAs or other identifiers, and associate one or more parameters, such as duplicate count 252, aggregate operation parameters, hash values, etc. with duplicate sets of data units. An example data structure for duplicate data entries is provided below with regard to FIG. 3.

Storage device 120 may include an allocation engine 260 configured to allocate host data units to storage locations based on their performance needs, such as allocating data to fast storage locations or slow storage locations based on their access frequencies. Allocation engine 260 may include a hot data path 262 for data units identified as having higher performance needs and a cold data path 262 for data units identified as having lower performance needs. For example, hot data path 262 may include media channels to faster SLC flash devices in storage device 120 and cold data path 262 may include media channels to slower MLC flash devices in storage device 120. Allocation engine 260 may evaluate one or more parameters against a performance threshold 266 to determine which path to use for write commands and/or when to migrate data units in response to write commands (e.g., when a data unit read from fast media no longer meets hot data threshold 218 or a data unit read from slow media does). Allocation engine 260 may support one or more processes for determining an operation score for the target data unit, such as a number of operations per unit time over a performance period, and comparing it to a corresponding performance threshold, such as hot data threshold 218. In some embodiments, allocation engine 260 may be configured to support use of an aggregate operation score for duplicate data units, based on aggregating operation parameters across the duplicate data units, to evaluate the performance threshold 266. In some embodiments, allocation engine 260 may be configured to support deduplication engine 240 in selecting or targeting duplicate data units in one allocation type (e.g., hot data or cold data) for elimination.

In some embodiments, storage device 120 may be configured to notify host device 102 of duplicates and/or elimination of duplicates. For example, storage device 120 may send a duplicate or elimination notification 272 to host device 102 that identifies each duplicate data unit determined by duplicate checker 242 and/or any elimination actions taken by storage device 120, such as rejection or a write command or one or more delete operations. In some embodiments, deduplication engine 240 merely notifies host device 102 of determined duplicates and any further action, such as secondary evaluation of duplicate status and/or responsive storage operations (delete commands) may be initiated by host device 102. Host device 102 may include a response handler 274 configured to process the duplicate information received from storage device 120. For example, response handler 274 may include logic for updating LBA and other information related to elimination actions by storage device 120 and/or additional duplicate evaluation and duplicate policy logic to generate further storage operations, such as delete commands targeting duplicate data units.

Figure 3:
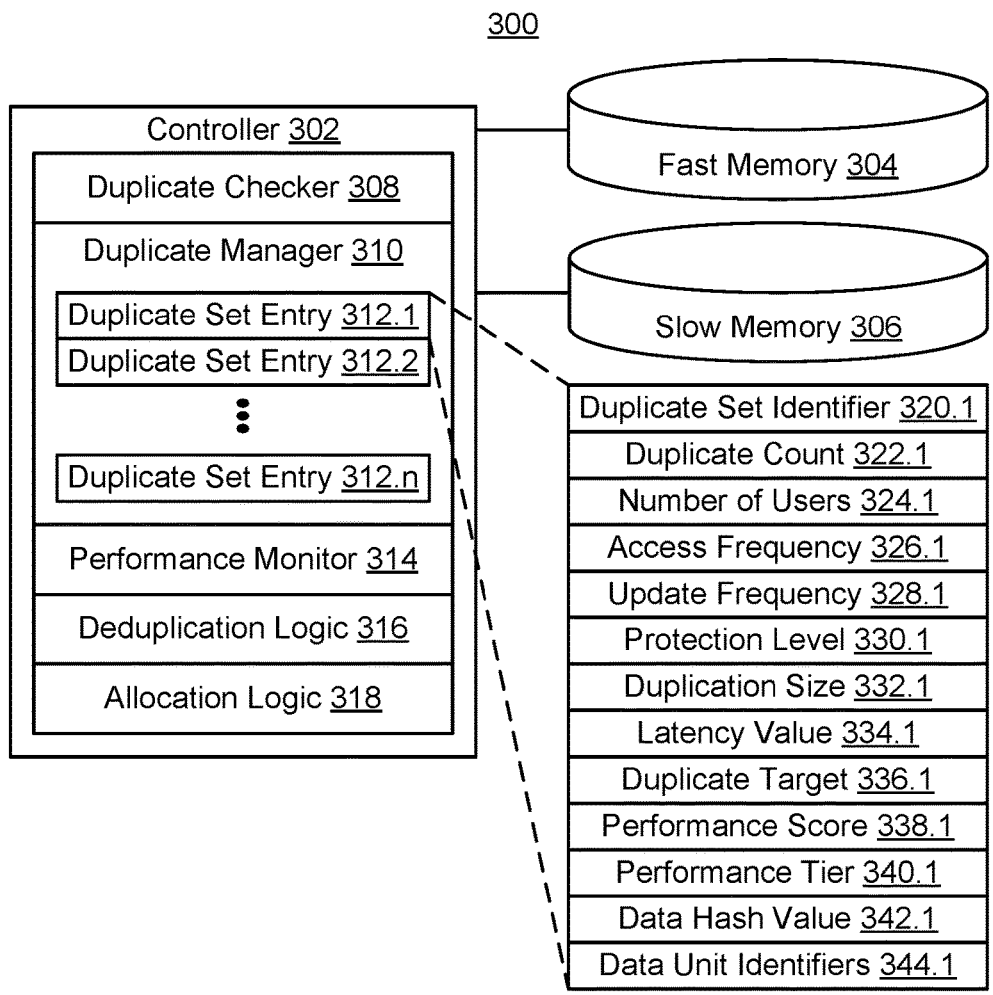
FIG. 3 schematically illustrates a controller configured for duplicate management that may be used by the storage system of FIG. 1.

FIG. 3 shows a schematic representation of a controller 302 configured for duplicate management in a storage system 300. In some embodiments, storage system 300 may be implemented in storage system 100 of FIG. 1 and/or incorporate features from storage system 200 in FIG. 2. For example, the functions of controller 302 may be embodied in a host controller, such as processor 104 and memory 106 of host device 102, and/or a storage device controller, such as storage device controller 130. In some embodiments, controller 302 and/or the functions therein may be embodied in a storage manager, such as host storage manager 114 or device storage manager 134. The functions of controller 302 as embodied in a storage device may be further described below with regard to storage device 500 in FIG. 5. In some embodiments, controller 302 may include any number of additional functions in addition to those shown.

In some embodiments, controller 302 may communicate with a plurality of storage mediums, such as the storage media devices of storage device 120 or multiple storage devices supporting host device 102. For example, controller 302 may communicate with fast memory 304 and slow memory 306 for executing storage operations for host data units. In some embodiments, fast memory 304 may include one or more memory devices with a higher operation parameter, such as input/output operations per second, relative to slow memory 306.

Controller 302 may include a duplicate checker 308 configured to determine a set of duplicate host data units as further described elsewhere. For example, duplicate checker 308 may scan fast memory 304 and/or slow memory 306 to identify host data units that are stored in the memories in multiple copies and provide the duplicate sets of host data units to duplicate manager 310. Duplicate manager 310 may be configured to receive, access, determine, and/or store metadata regarding the duplicate sets of data units identified by duplicate checker 308. For example, duplicate manager 310 may include a data structure comprising a plurality of duplicate set entries 312.1-312.n. Each duplicate set entry 312 may identify a set of data units comprising the duplicate set, such as a list of host LBAs or other identifiers, and one or more aggregate parameters for the duplicate set, such as the duplicate count (number of copies in the set), storage parameters, operation parameters, etc. An example duplicate set entry 312 is further described below.

Controller 302 may include a performance monitor 314 configured to receive, access, determine, and/or store operation parameters for fast memory 304, slow memory 306, and storage operations executed using them. For example, performance monitor 314 may monitor all read, write, delete, and other operations and aggregate related operation parameters, such as total operations, operations per operation type, operations per unit time, operations during various time periods, etc. In some embodiments, performance monitor 314 may also include or determine system metrics, such as total storage capacity, available capacity, valid/invalid fragment counts, communication or operation latency, etc. In some embodiments, performance monitor 314 may use one or more operation logs to determine operation parameters. For example, each storage operation may generate a log entry descriptive of the operation type, operation time, target data unit, user identifier, and other operation parameters. Parameters may be determined by traversing the log entries and collecting various counts, indicators, and other derived values. In some embodiments, performance monitor 314 may be configured to determine performance data for individual data units, such as frequency of access (read), frequency of update (write), elapsed time since last operation, allocation type (hot or cold), etc.

In some embodiments, performance monitor 314 may be configured with logic to generate the aggregate operation parameters to support duplicate manager 310. For example, performance monitor 314 may be configured to sum the access values and/or update values, determine a number of unique users or applications, determine minimum/maximum/average values (highest latency time, lowest latency time, etc.). In some embodiments, performance monitor 314 may include functions or services for receiving an aggregate operation parameter type and duplicate set of data unit identifiers, execute corresponding aggregation logic against one or more operation parameters it monitors, and return the aggregate operation parameter value for that duplicate set.

Deduplication logic 316 may be configured to determine unneeded duplicates in a duplicate set and eliminate those duplicates, as described elsewhere in the specification. Allocation logic 318 may be configured to allocate data units to two or more performance types (e.g., hot and cold) and corresponding storage locations (e.g., fast memory and slow memory), as described elsewhere in the specification.

In the example shown, duplicate set entry 312.1 is comprised of a plurality of fields or parameters describing a duplicate set of host data units. A duplicate set identifier 320.1 may include a unique identifier that may be used to index duplicate set entries 312. For example, duplicate set identifier 320.1 may incorporate the host LBA or other identifier for a first occurrence or target data unit that generated the set of duplicates and/or otherwise incorporate one or more data unit identifiers from the duplicate set. Duplicate count 322.1 may include an integer value that corresponds to the number of data units in the duplicate set.

Number of users 324.1 may be an aggregate operation parameter that includes a count of the unique users or applications that have executed storage operations against the host data units in the duplicate set. For example, each storage operation may include a source identifier corresponding to users, applications, hosts, or other sources of the storage operation and number of users 324.1 may determine the unique identifiers across all operations against the duplicate set to provide one or more counts. Access frequency 326 may be an aggregate operation parameter that includes a value corresponding to the read operations and/or total operations targeting the duplicate set. Update frequency 328 may be an aggregate operation parameter that includes a value corresponding to the write operations targeting the duplicate data set. Frequency values may include a number of occurrences per unit time or total operations, such as write operations per minute or per 1000 storage operations. Frequency values may be expressed as percentages, totals during a performance period (time or operating window of interest), or other units or variations on the underlying aggregate parameters from a parameter source, such as performance monitor 314 and/or operation logs.

Protection level 330.1 may include a value designating a protection scheme or policy applied to one or more data units in the duplicate set. For example, host data units may be assigned a protection level value in storage operation parameters and/or host metadata that may influence reliability and/or security factors such as ECC configuration, encryption, replication, etc. In some embodiments, these protection levels may be selected from a group of predefined protection levels supported by storage system 300. Duplication size 332.1 may include one or more size values, such as the size of each host data unit and/or aggregate size of all data units in the duplicate set. Latency value 334.1 may include one or more latency values related to storage operations against the host data units of the duplicate sets. Latency value 334.1 may include average, maximum, or minimum latency values based on operation types (read or write) and sources across the duplicate set as aggregate operation parameters.

Duplicate target 336.1 may be a value for the number or range of duplicates that may be present in the storage medium to comply with the duplicate policy of the system. Duplicate target 336.1 may be a derived value calculated by deduplication logic 316 and/or duplicate manager 310 using one or more of the aggregate operation parameters. In some embodiments, the duplicate policy may include a duplicate target algorithm that combines a plurality of aggregate operation parameters with weighting factors (for each parameter) and a mapping function to determine the number or range of acceptable duplicates.

Operation score 338.1 may be a value for the aggregate use of the duplicate set that determines which performance tier the duplicate set should be stored in. Operation score 338.1 may be a derived value calculated by allocation logic 318 and/or duplicate manager 310 using one or more of the aggregate operation parameters. In some embodiments, the duplicate policy may include a duplicate operation score algorithm that combines a plurality of aggregate operation parameters with weighting factors (for each parameter) and a mapping function to determine an operation score value that corresponds to the performance thresholds the system uses for individual host data units. Performance tier 340.1 may be a value corresponding to the performance tier, such as hot data or cold data, in which the duplicate set should be stored. Performance tier 340.1 may be a derived value calculated by allocation logic 318 based on a comparison of operation score 338.1 to one or more performance thresholds.

In some embodiments, data hash value 342.1 may include a data hash of at least one of the host data units in the duplicate set. Data hash value 342.1 may be used by duplicate checker 308 when scanning or verifying duplicates to generate or update the duplicate set. In some embodiments, data unit identifiers 344.1 may include host data unit identifiers, such as host LBA, globally unique identifier (GUID), object name, etc., that enables the storage location and/or metadata for each host data unit in the duplicate set to be determined. For example, data unit identifiers 344.1 may include a list of host LBAs for the host data units in the duplicate set and enable duplicate manager 310 to return the list in response to queries regarding the host data units in the duplicate set. Data unit identifiers 344.1 may be used to access host metadata and/or host storage locations for further operations related to the duplicate data set, including deduplication, replication, migration between performance tiers, deletion, etc.

Figure 4:
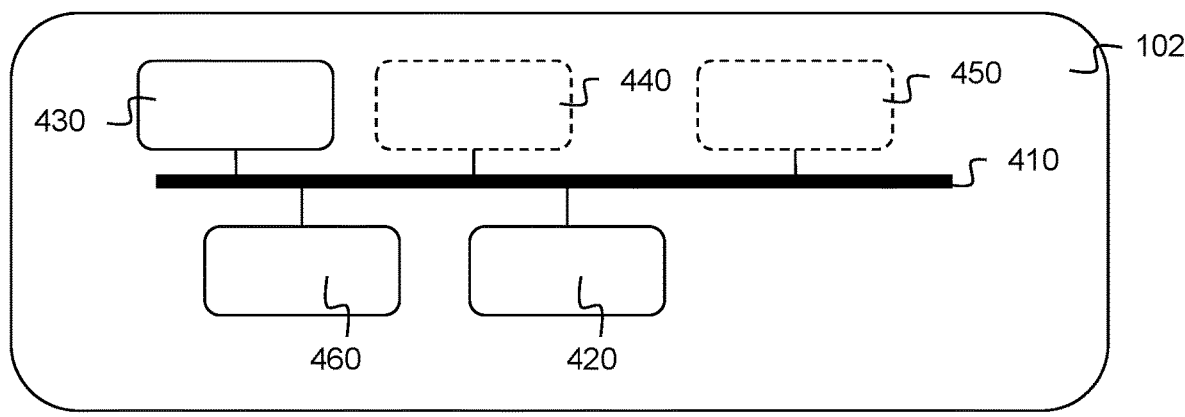
FIG. 4 schematically illustrates a host device of the storage system of FIG. 1.

FIG. 4 shows a schematic representation of an example host device 102. Host device 102 may comprise a bus 410, a host processor 420, a host memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Host memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, duplicate management configuration 210, storage operations 220, management operations 230, and/or response handler 274 in FIG. 2 and/or controller 302 in FIG. 3 may be instantiated in instructions, operations, or firmware stored in host memory 430 for execution by host processor 420. An optional input unit 440 may include one or more conventional mechanisms that permit an operator to input information to host 102 such as a keyboard, a mouse, a pen, voice recognition and/or biometric mechanisms, etc. In some embodiments, optional input unit 440 may include image, audio, infrared, and/or other sensors for video camera or other consumer electronics functions. Optional output unit 450 may include one or more conventional mechanisms that output information to the operator or user, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe, USB, SD, SDXC, or other interfaces for connecting to storage device 120 and/or a network interface for communicating with storage device 120 over a fabric network.

Figure 5:
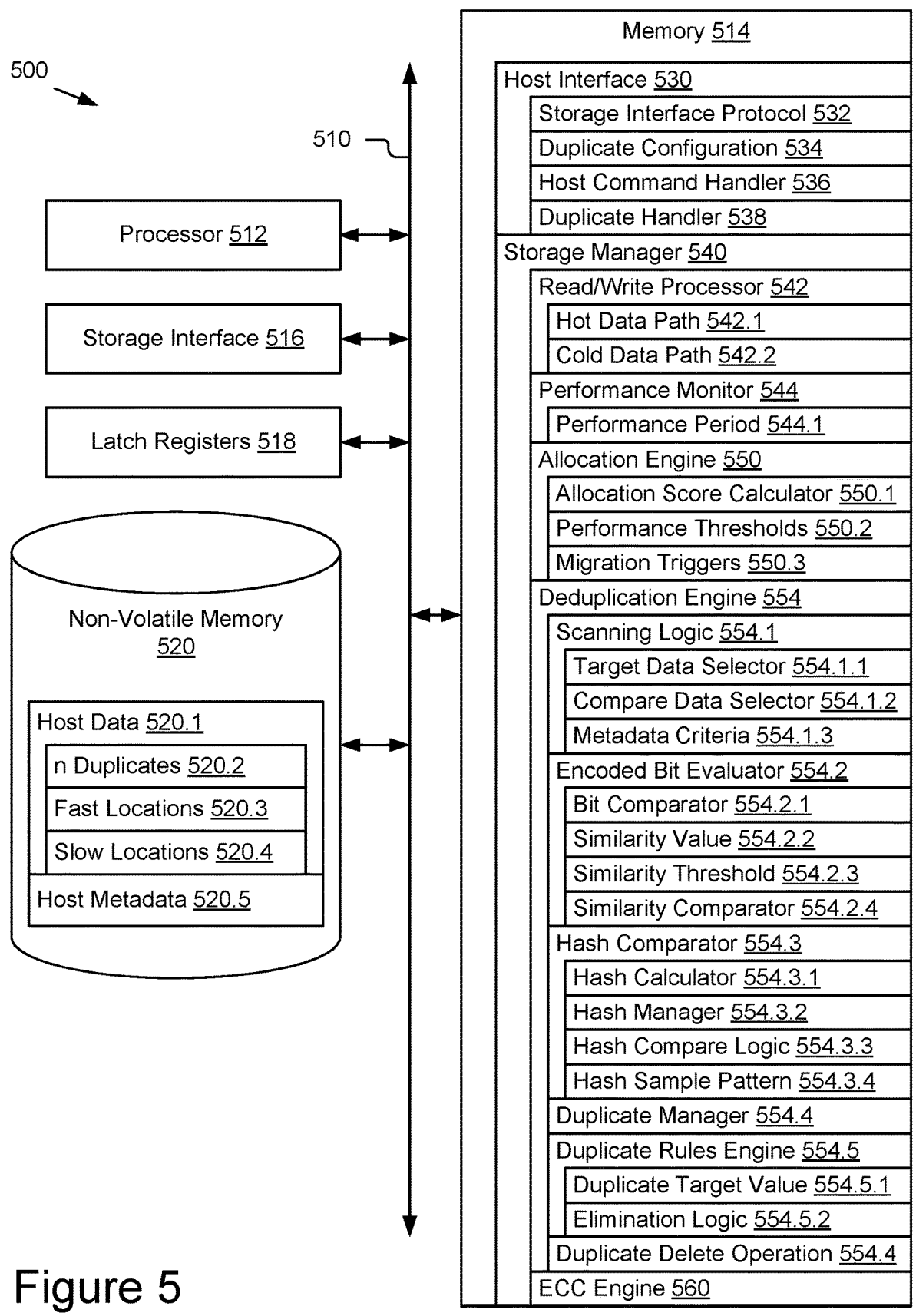
FIG. 5 schematically illustrates some elements of the storage device of FIG. 1-3 in more detail.

FIG. 5 schematically shows selected modules of a storage device 500 configured for storage device deduplication operations using encoded host data. Storage device 500 may incorporate elements and configurations similar to those shown in FIGS. 1-3. For example, storage device 500 may be a storage device configured as storage device 120 in storage system 100, where the storage device includes bus 510, processor 512, memory 514 (instantiating host interface 530 and storage manager 540), storage interface 516, and latch registers 518 in storage device controller 130 and non-volatile memory 520 in NVM devices 140.

Storage device 500 may include a bus 510 interconnecting at least one processor 512, at least one memory 514, and at least one interface, such as storage interface 516. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage interface 516 may include a physical interface for communication between a storage device and a host or client using an interface protocol that supports storage device access. For example, storage interface 516 may include a USB, SD, SDXC, PCIe, serial advanced technology attachment (SATA), serial attached small computer system interface (SCSI) (SAS), fibre channel, or similar storage interface connector supporting access to solid state media comprising non-volatile memory devices 520. In some embodiments, storage interface 516 may connect to or incorporate a network interface for connecting to a fabric network and/or other network. For example, storage interface 516 may connect to a network fabric interface through a backplane network and/or storage network interface controller supporting an NVMe-over-fabric (NVMeoF) protocol. In some embodiments, storage devices, hosts, clients, and/or other components of storage system 500 may be configured as nodes in the NVMeoF topology and communicate using supported NVMe commands, such as NVMe telemetry commands.

Latch registers 518 may include a latch subsystem for holding a series of bit data read from non-volatile memory 520. In some embodiments, latch registers 518 may be part of the memory channel interconnecting the storage device controller and media devices storing the host data. Latch registers 518 may be configured to receive data bits read from non-volatile memory 520 prior to applying ECC decoding (such as decode processing through ECC engine 560). In some embodiments, latch registers 518 may be configured in latch layers where each latch layer may receive a series of bit values. Latch layers may be arranged in parallel and enable bit values to be paired and compared between or across layers. For example, bit 1 of layer 1 may be compared to bit 1 of layer 2, bit 2 of layer 1 may be compared to bit 2 of layer 2, bit 3 of layer 1 may be compared to bit 3 of layer 2, etc. across all corresponding bit pairs. In some embodiments, additional latch layers may also be selectively compared such that data in latch layer 1 may be compared against data in latch layer 2, then latch layer 3, then latch layer 4, etc. In some embodiments, latch registers 518 may reside within the memory devices of non-volatile memory 520.

Storage device 500 may include one or more non-volatile memory devices 520 configured to store host data 520.1. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells. In some embodiments, non-volatile memory devices 520 may include the storage medium of a storage device, such as NVM devices 140 in storage devices 120. In some embodiments, non-volatile memory 520 may be comprised of multiple types of storage media devices having different performance characteristics. For example, non-volatile memory 520 may be configured to store host data 520.1 in fast storage locations 520.3, corresponding to memory locations with a relatively fast input/output performance, and slow storage locations 520.4, corresponding to memory locations with relatively slow input/output performance. In some embodiments, fast storage locations 520.3 may be located in SLC devices and slow storage locations 520.4 may be located in MLC devices.

Storage system 500 may include a plurality of modules or subsystems that are stored and/or instantiated in memory 514 for execution by processor 512 as instructions or operations. For example, memory 514 may include a host interface 530 configured to receive, process, and respond to host data requests and/or management commands from client or host systems. Memory 514 may include storage manager 540 configured to manage storage and management operations to the media devices comprising non-volatile memory 520.

Host interface 530 may include an interface protocol and/or set of functions, parameters, and/or data structures for receiving, parsing, responding to, and otherwise managing host data requests from a host. For example, host interface 530 may include functions for receiving and processing host requests for reading, writing, modifying, or otherwise manipulating data blocks and their respective client or host data 520.1 and/or metadata 520.3 in accordance with host communication and storage protocols. Host interface 530 may also support administrative commands and/or management operations initiated by the host or the storage device, such as configuration changes, garbage collection, log access, firmware management, reporting of operational parameters, deduplication operations, etc. For example, host interface 530 may support administrative command sets for configuring namespaces, queue control, log access, feature identification and configuration, security settings, and/or performance monitoring. In some embodiments, host interface 530 may enable direct memory access and/or access over NVMe protocols through storage interface 516. For example, host interface 530 may include host communication protocols compatible with USB, SD, SDXC, PCIe, SATA, SAS, and/or another bus interface. Host interface 530 may further include deduplication interface protocols compatible with configuring and enabling in-device duplicate detection and/or deduplication with varying levels of host support. For example, host interface 530 may enable configuration of in-device deduplication operations on a periodic, event-based, or host-response basis, such as within host storage command processing or responsive to a deduplication command, and handle host data and/or notifications provided to a host or client node in response to deduplication operations.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage interface 516. For example, storage interface protocol 532 may include USB, SD, SDXC, PCIe, NVMe, and/or other protocol compliant communication, command, and syntax functions, procedures, and data structures. In some embodiments, host interface 530 may include a duplicate configuration 534 configured to provide duplicate management configuration, including default deduplication parameters and/or receive deduplication parameters from a host to configure deduplication engine 554. In some embodiments, host interface 530 may include a host command handler 536 configured to receive and parse host commands, such as storage commands and/or deduplication commands, for execution by storage manager 540. In some embodiments, host interface 530 may include a duplicate handler 538 configured to notify the host of duplicate sets and deduplication operations and outcomes, sometimes including the return of host data. In some embodiments, host interface 530 may include additional modules (not shown) for input/output (I/O) commands, buffer management, storage device configuration and management, and other host-side functions.

In some embodiments, duplicate configuration 534 may be configured to include a set of configuration parameters for selectively determining the operation of deduplication engine 554 to provide in-device duplicate identification and processing. For example, duplication configuration 534 may include a default set of configuration parameter values describing the capabilities and default settings of deduplication engine 554 and/or a default duplicate policy. In some embodiments, duplicate configuration 534 may support host queries to determine the current parameter settings and/or supported ranges and functions for those settings. For example, a configuration read command may be received and parsed by host command handler 536 and return one or more configuration values. In some embodiments, duplicate configuration 534 may be used to configure the logic and parameters used by deduplication engine 554 in accordance with a host duplicate policy. For example, duplicate configuration 534 may include a configuration page, file, or database that includes deduplication trigger rules, target and comparison selection criteria, metadata criteria, similarity value calculators, similarity threshold calculators, hash calculators, hash sampling patterns, duplicate operation score calculators, duplicate rules, and other parameters related to the operation of deduplication engine 554.

In some embodiments, host command handler 536 may include an interface and/or communication event-based condition for receiving data requests and/or operational commands from one or more hosts. Host command handler 536 may receive these requests and parse them according to the appropriate communication and storage protocols. For example, host command handler 536 may identify a transaction identifier, a data unit identifier (LBA, object name, globally unique identifier (GUID), etc.), a data operation, a source identifier, and additional parameters for the data operation, if any, from the received message or messages that make up the host command. Similarly, operational or management commands, such as deduplication commands, may include syntax and parameters for determining the scope, targets, priority, response conditions, etc. for the management commands.

In some embodiments, duplicate handler 538 may be configured to manage the host response for deduplication operations executed by deduplication engine 554. For example, once host command handler 536 has initiated a deduplication operation responsive to a storage command or a deduplication command, duplicate handler 538 may wait for the deduplication operation to complete and provide a corresponding response to the host. In some embodiments, duplicate configuration 534 and deduplication engine 554 may include deduplication operations initiated by storage device 500 without a corresponding host command and duplicate handler 538 may be configured to respond to completion of those operations and provide corresponding messages to the host. For example, duplicate handler 538 may be configured to return a list of device-determined duplicates and/or actions taken responsive to determining the duplicates (such as deletion of a subset of those duplicates) without receiving a corresponding host command. In some embodiments, duplicate handler 538 may transfer one or more host data units from the duplicate set of device-determined duplicates to the host for further processing.

Storage manager 540 may include an interface protocol and/or set of functions, parameters, and data structures for reading, writing, and deleting host data units in non-volatile memory devices 520. For example, storage manager 540 may include a read/write processor 542 for executing host data operations related to host storage commands received through host interface 530 and host command handler 536. For example, PUT or write commands may be configured to write host data units to non-volatile memory devices 520 through a write processor. GET or read commands may be configured to read data from non-volatile memory devices 520 through a read processor. DELETE commands may be configured to delete data from non-volatile memory devices 520, or at least mark a data location for deletion until a future garbage collection or similar operation actually deletes the data or reallocates the physical storage location to another purpose.

In some embodiments, the read/write channels of read/write processor 542 may include access to media devices within non-volatile memory 520 that support different performance characteristics. For example, read/write processor 542 may be configured to selectively read and write to fast storage locations 520.3 and slow storage locations 520.4. In some embodiments, read/write processor 542 may be configured with a hot data path 542.1 for host data units allocated to a high-performance tier and a cold data path 542.2 for host data units allocated to a lower performance tier. For example, storage operations received by host command handler may specify a performance tier and/or data units targeted by a storage command may be allocated to a storage tier by allocation engine 550 based on operation parameters from performance monitor 544. In some embodiments, host command handler 536 and/or read/write processor 542 may initiate allocation engine 550 to determining a performance tier for host storage commands. In some embodiments, allocation engine 550 and/or deduplication engine 554 may include performance tier parameters in maintenance storage operations (such as deduplication and tier migration) directed to read/write processor 542.

In some embodiments, storage manager 540 may include flash translation layer (FTL) management, data state machine, read/write buffer management, garbage collector, NVM device interface protocols, NVM device management, and other device-side functions. In some embodiments, storage manager 540 may include performance monitor 544, allocation engine 550, deduplication engine 554, and ECC engine 560 for supporting duplicate management operations and other storage operations.

In some embodiments, storage manager 540 may include a performance monitor 544. Storage manager 540 may include various functions that generate operational parameters, such as workload data, error rates, configuration parameters, physical parameters, storage parameters (e.g., aggregate storage space used/available/marked for garbage collection, wear leveling statistics, etc.), error logs, event logs, and other operational parameters that may be aggregated and reported through various interfaces, functions, or services. Performance monitor 544 may be configured to selectively receive, access, determine, and/or store operation parameters for storage operations executed to non-volatile memory 520 based on the operational parameters available to storage manager 540. For example, performance monitor 544 may monitor all read, write, delete, and other operations and aggregate related operation parameters, such as total operations, operations per operation type, operations per unit time, operations during various time periods, etc. In some embodiments, performance monitor 544 may also include or determine system metrics, such as total storage capacity, available capacity, valid/invalid fragment counts, communication or operation latency, etc. In some embodiments, performance monitor 544 may use one or more operation logs to determine operation parameters. For example, each storage operation may generate a log entry descriptive of the operation type, operation time, target data unit, user identifier, and other operation parameters. Parameters may be determined by traversing the log entries and collecting various counts, indicators, and other derived values.

In some embodiments, performance monitor 544 may be configured with logic to generate the aggregate operation parameters to support allocation engine 550 and/or deduplication engine 554. For example, performance monitor 544 may be configured to sum the access values and/or update values, determine a number of unique users or applications, determine minimum/maximum/average values (highest latency time, lowest latency time, etc.). In some embodiments, performance monitor 544 may include functions or services for receiving an aggregate operation parameter type and duplicate set of data unit identifiers, execute corresponding aggregation logic against one or more operation parameters it monitors, and return the aggregate operation parameter value for that duplicate set. In some embodiments, performance monitor 544 may be configured to support one or more performance periods for determining operation parameters. For example, performance period 544.1 may be configured as a sliding window that ends at the most recent storage operation and aggregates operation parameters for a configurable period of time or number of operations. Example performance periods 544.1 may include 1 minute, 10 minutes, 1 hour, 1000 operations, 10000 operations, etc., measured from the current clock time, most recent operation, or most recent operation timestamp.

In some embodiments, storage manager 540 may include allocation engine 550 configured to allocate host data units to one of two or more performance tiers. For example, allocation engine 550 may be initiated responsive to a storage operation or as part of a background or management operation to determine whether a target host data unit should be allocated to a hot data performance tier or a cold data performance tier. In some embodiments, allocation engine 550 may be configured to make dynamic allocation determinations based on calculating an allocation score from current operation parameters and comparing that operation score against one or more performance thresholds. For example, allocation engine 550 may include an allocation score calculator 550.1 that includes logic and/or algorithms for calculating an operation score for a target host data unit. In some embodiments, allocation score calculator 550.1 may include both a single data unit algorithm and a duplicate data unit algorithm. For example, a single data unit algorithm may include aggregating the number of access operations or commands targeting that data unit over performance period 544.1 and multiplying it by a weighing factor. Duplicate data unit algorithms may include using a plurality of aggregate operation parameters from across the duplicate set of data units and giving each aggregate operation parameter term a weighting factor. For example, the operation score for each data unit in a duplicate set may equal:

(weighting factor $X$)*(total number of operations for all data units during period)+(weighting factor $Y$)*(number of sources for all data units during period)+(weighting factor $Z$)*(number of copies in duplicate set)

This algorithm is an example only and a variety of combinations of aggregate operation parameters and other terms, with or without weighting factors, may be used to determine an operation score.

In some embodiments, allocation engine 550 may compare the operation score from allocation score calculator 550.1 to performance threshold 550.2. For example, allocation engine 550 may be configured with a plurality of performance ranges mapped to the range of operation scores and segmented by at least one performance threshold 550.2. A data unit or duplicate set with a given operation score may be in first performance tier if it falls below performance threshold 550.2 and another performance tier if it meets or exceeds the performance threshold. For example, allocation engine 550 may include a hot data threshold and data units or duplicate sets meeting the hot data threshold may be allocated to the hot data performance tier. Data units or duplicate sets falling below the hot data threshold may be allocated to the cold data performance tier. In some embodiments, performance threshold 550.2 may be a configurable parameter and/or a dynamic value based on system-level parameters and/or historical performance models. Allocation engine 550 may include multiple performance thresholds 550.2, including multiple thresholds for a performance algorithm that segments the range into more than two performance tiers and/or different thresholds for different performance algorithms.

In some embodiments, allocation engine 550 may be configured to migrate data units between performance tiers over time, responsive to their operation scores changing. For example, allocation engine 550 may include a plurality of migration triggers for moving a host data unit from a hot data performance tier to a cold data performance tier or from a cold data performance tier to a hot data performance tier. In some embodiments, operation score may be recalculated for each storage operation targeting a data unit. In the case of a read operation of a previously cold data unit that now calculates as a hot data unit, a migration trigger 550.3 may be met and a migration operation may be initiated to move the data unit from the cold data storage location to a hot data storage location. In some embodiments, allocation engine 550 may be configured to scan host data units and calculate their operation scores, with changes in performance tiers acting as migration triggers 550.3. For example, a performance tier scan command may be received by host command handler 536 and/or a background performance scan operation may be triggered on a scheduled or event basis. In some embodiments, deduplication engine 554 may generate one or more migration triggers 550.3 based on a duplicate check and/or elimination event. For example, deduplication engine 554 may determine a duplicate set that includes one or more data units that are in different performance tiers than the performance tier allocated in the most recent performance tier calculation and deduplication engine 554 may trigger migration triggers 550.3 to migrate the one or more data units to the new performance tier.

In some embodiments, allocation engine 550 may be configured to assist deduplication engine 554 in selecting or targeting duplicate data units for deletion during an elimination operation. For example, elimination logic 554.5.2 may be configured to use performance tier allocations to assist in determining which duplicate data units to delete. In some embodiments, a duplicate set may be allocated to a hot data performance tier, but still contain data units that were previously written to the cold data performance tier. Elimination logic 554.5.2 may target the data units in the cold data performance tier for deletion. Similarly, a duplicate set may be allocated to a cold data performance tier, but still contain data units that were previously written to the hot data performance tier. Elimination logic 554.5.2 may target the data units in the hot data performance tier for deletion.

In some embodiments, storage manager 540 may include deduplication engine 554 configured to execute in-device deduplication operations. For example, deduplication engine 554 may be initiated by host command handler 536 in response to one or more storage commands and/or deduplication commands. In some embodiments, deduplication engine 554 may include one or more deduplication triggers that operate in conjunction with host commands or independent from them. For example, duplicate configuration 534 may define deduplication trigger rules based on a schedule (e.g., periodic deduplication scans), operating condition (idle time operations reaching a priority assigned to deduplication), and/or storage parameters (available storage capacity dropping below a capacity threshold). In some embodiments, host storage commands may include a deduplication flag or parameter that triggers deduplication engine 554 to execute a deduplication operation for the host data unit targeted by the storage operation. For example, a host write operation may trigger a deduplication operation to determine whether the target data unit is already stored (and/or is stored in a number of copies at or above a duplicate target) before writing the new copy (and may discard the write operation if the duplicate is not within the duplicate policy. As another example, a host read operation may trigger a deduplication operation to determine whether the target data unit is stored in multiple copies and, if the number of copies exceeds the duplicate policy, eliminate one or more extra copies. In some embodiments, deduplication engine 554 may be configured to handle duplicate check commands and return duplicate sets without triggering duplicate rules engine 554.5. For example, scanning logic 554.1, encoded bit evaluator 554.2, and/or hash comparator 554.3 may operate as a duplicate checker operation, rather than a deduplication operation, and update a host device and/or duplicate manager 554.4 with the results of the duplicate check.

A deduplication operation may include at least one target data unit and a scan of one or more stored data units for comparison. Deduplication engine 554 may include scanning logic 554.1 configured to scan encoded host data 520.1 in non-volatile memory 520 for encoded host data pairs to compare for similarity. For example, for any host data unit, encoded host data 520.1 may include n duplicates 520.2, where a duplicate is defined as a host data unit that has a similarity to another host data unit sufficient that the two host data units are functionally equivalent, and scanning logic 554.1 may be configured to select a target host unit and a set of comparison host units for comparison by deduplication engine 554.

Scanning logic 554.1 may include a target data selector 544.1.1 configured to determine the host data unit to be compared against other host data units. For example, target data selector 544.1.1 may receive a target data unit that is included in or indicated by a host command. In some embodiments, target data selector 544.1.1 may include logic for selecting targets for drive-initiated deduplication operations and/or deduplication operations indicating a plurality of host data units, such as a zone or data type. For example, target data selector 544.1.1 may include criteria for determining a list of target candidates based on LBA, storage parameters, and/or host metadata and randomizing and/or generating and sorting a queue for systematically running deduplication operations against each target data unit in the list. In some embodiments, scanning logic 554.1 may include similar logic for a compare data selector 544.1.2 configured to determine the set of comparison data units to be compared to the target data unit. For example, compare data selector 544.1.2 may include criteria for selecting and organizing host data units for sequential comparison to the target data unit. In some embodiments, target data selector 544.1.1 and/or compare data selector 544.1.2 may include or access metadata criteria 544.1.3 that may define a set of metadata parameters for selecting target and/or comparison data units. For example, host metadata 520.3 may include one or more data stores and/or data tables describing host data units and target data selector 544.1.1 and/or compare data selector 544.1.2 may query host metadata 520.5 using metadata criteria 544.1.3 to generate a target set and/or comparison set of host data units. In some embodiments, scanning logic 554.1 may return at least one target data unit and at least one comparison data unit (by LBA or other identifier) for deduplication engine 554 to compare.

In some embodiments, deduplication engine 554 may include an encoded bit evaluator 554.2 configured to read encoded data units from non-volatile memory 520 and compare them bit-by-bit to determine their similarity (based on matching bit pairs between the compared data units). For example, encoded bit evaluator 554.2 may read encoded host data units into a register or other memory space without decoding the data units using ECC engine 560. In some embodiments, latch registers 518 may be used to hold the target and compare data units for comparison. A bit comparator 554.2.1 may be configured to compare bit pairs between the target data unit and the comparison data unit to determine whether the bits are equal or unequal. For example, a XOR operation may return a count for each unequal set of bits. Encoded bit evaluator 554.2 may calculate a similarity value 554.2.2. For example, encoded bit evaluator 554.2 may sum the count of unequal bits returned by bit comparator 554.2.1 to determine similarity value 554.2.2. Encoded bit evaluator 554.2 may compare similarity value 554.2.2 to a similarity threshold 554.2.3 using a similarity comparator 554.2.4. For example, the sum of unequal bits may be compared to a threshold value determined from a predicted error rate for the host data by similarity comparator 554.2.4 and return comparison data units that do not exceed the threshold value. As discussed above, other configurations for determining similarity value 554.2.2, similarity threshold 554.2.3, and how they are compared are possible, such as patterns, percentages, dynamic thresholds, and/or relative values across a set of comparison data units. In some embodiments, encoded bit evaluator 554.2 may return a set of duplicate host data units based on bit comparison of encoded host data. In some embodiments, the set of duplicate host data units may be directed through ECC engine 560 for decoding and a set of decoded duplicate host data units may be returned.

In some embodiments, deduplication engine 554 may use the duplicates determined by encoded bit evaluator 554.2 for duplicate processing. The duplicates determined from the encoded data may be identified to duplicates manager 554.4 and/or duplicate rules engine 554.5 for handling the duplicates and determine responsive actions, such as elimination of unneeded duplicates. In some embodiments, duplicates determined by encoded bit evaluator 554.2 may be returned as results from deduplication engine 554 and returned to the host for further processing through duplicate handler 538. For example, the host may receive the decoded host data blocks, execute secondary duplicate verification, and determine responses based on its own duplicate policy, as described with regard to FIG. 3. In some embodiments, deduplication engine 554 may be configured for secondary processing and/or duplicate verification, such as by hash comparator 554.3.

Hash comparator 554.3 may be configured to use hashes of the decoded host data units for an additional comparison to confirm that duplicates determined by encoded bit evaluator 554.2 meet a defined standard for duplicates. For example, hash comparator 554.3 may receive a set of duplicate data units identified by encoded bit evaluator 554.2, such as a list of host LBAs or the decoded data units themselves. Hash comparator 554.3 may include a hash calculator 554.3.1 configured to calculate a hash value for each host data unit based on a hashing algorithm. For example, hash calculator 554.3.1 may apply a hash function to each data unit to generate a fixed-length and unique hash value that can be compared to the hash values generated for each other duplicate. Hash comparator 554.3 may include a hash manager 554.3.2 configured to store calculated hash values to be reused across comparisons. For example, the hash value of the first duplicate, such as the target data unit, may be stored in a data structure in duplicate manager 554.3 and used for compare operations with each other hash value. In some embodiments, hash values may be calculated and stored by a hash calculator in the host device and/or retained between deduplication operations to reduce the occurrence of hash calculations by storage device 500. Hash comparator 554.3 may include hash compare logic 554.3.3 configured to compare the hash value of the target data unit to each other duplicate data unit and/or every combination of duplicate data units to confirm that the corresponding host data units are identical. In some embodiments, hash comparator 554.3 may be configured to use a subset of each host data unit for calculating the hash. For example, hash comparator 554.3 may include a hash sample pattern 554.3.4 that determines a selected set of data blocks (aligned with the block size of the hashing function) from defined positions in each host data unit for hash calculator 554.3.1. Hash comparator 554.3 may return a set of verified duplicate host data blocks based on the duplicate data units determined by host comparator 554.3 to have identical hash values. In some embodiments, the set of verified duplicate host data units may processed through duplicate rules engine 554.5 to determine further action.

In some embodiments, deduplication engine 554.4 may include a duplicate manager 554.4 configured to aggregate information regarding duplicates, such as identifiers for duplicates from encoded bit evaluator 554.2 and/or verified duplicates from hash comparator 554.3. For example, duplicate manager 554.4 may include a data structure and/or fields in host metadata 520.3 to identify known duplicates. Deduplication engine 554 may use duplicate manager 554.4 to reduce recalculation of duplicates and support other operations of deduplication engine 554, such as duplicate rules engine 554.5. In some embodiments, duplicate manager 554.4 may provide a data source for duplicate rules engine 554.5. In some embodiments, duplicate manager 554.4 may be configured to receive, access, determine, and/or store metadata regarding the duplicate sets of data units identified by deduplication engine 554. For example, duplicate manager 554.4 may include a data structure comprising a plurality of duplicate set entries populated with metadata from performance monitor 544, allocation engine 550, and/or deduplication engine 554. Each duplicate set entry 312 may identify a set of data units comprising the duplicate set, such as a list of host LBAs or other identifiers, and one or more aggregate parameters for the duplicate set, such as the duplicate count (number of copies in the set), storage parameters, operation parameters, etc.

Duplicate rules engine 554.5 may be configured to process one or more rule sets for determining actions responsive to determination of duplicates by encoded bit evaluator 554.2 and/or hash comparator 554.3. For example, duplicate rules engine 554.5 may use parameters corresponding to the set of duplicate host data units to evaluate logical rules for determining whether one or more duplicates should be eliminated. In some embodiments, duplicate rules engine 554.5 may use a duplicate target value 554.5.1, defining the number of copies that may be acceptably retained in storage device 500, from duplicate configuration 534 to determine responsive actions. For example, duplicate rules engine 554.5 may determine a number of duplicates in the set of duplicates for a target host data unit and compare the number of duplicates to duplicate target value 554.5.1. The amount by which the number of duplicates exceeds the duplicate target value may determine an elimination number of duplicate host data units to be deleted.

In some embodiments, duplicate rules engine 554.5 may include dynamic rules for generating duplicate target value 554.5.1 for a specific host data unit, such as based on the age, type, use, and other parameters of the duplicate data units for that host data unit. For example, duplicate target value 554.5.1 may be determined by a duplicate target algorithm based on aggregate operation parameters and configured to dynamically determine a preferred target number of duplicates. In some embodiments, duplicate rules engine 554.5 may determine or access one or more aggregate operation parameters, such as aggregate operation parameters determined by performance monitor 544 and/or stored by duplicate manager 554.4. In some embodiments, a duplicate target algorithm for calculating duplicate target value 554.5.1 may include a plurality of aggregate performance values and other storage values related to the duplicate data set. The various terms may include weighting factors and map to a range of duplicate targets such that duplicate target value 554.5.1 is a whole number value in defined range of duplicate targets.

In an example duplicate target algorithm, parameters may include transfer time to one or more sources (e.g., minimum/maximum/average latency to sources operating on any of the duplicate data units), number of sources (users, applications, hosts. etc.), frequency of access (read and/or all storage operations), frequency of update (write operations), protection level, size of data units, and number of copies (duplicate count). In some embodiments, the logic for determining duplicate target value 554.5.1 may be defined in a set of logical rules, such as if-then-else statements, parameters, and thresholds for dynamically mapping diverse parameter values to desired duplicate values or ranges. For example, the data unit size may be compared to a series of data size thresholds where the larger the data unit size the fewer copies are allowed in the target duplicate number. The higher the operation values, sources, and/or latency, the more copies may be allowed in the target duplicate number. Protection level may determine a minimum number of copies in the target duplicate number. A range of target duplicate numbers may be defined by duplicate configuration 534.

Duplicate rules engine 554.5 may also include elimination logic 554.5.2 for selecting corresponding elimination actions based on the duplicate data units to be eliminated, the trigger conditions for the deduplication operation (such as read command, write command, deduplication command, deduplication background process, etc.). For example, elimination of a write command may include discarding the write command from a command processing queue. Elimination of one or more duplicate data units from host data 520.1 may include selecting which copies to delete and when and elimination logic 554.5.2 may further include logical rules related to selecting deletion targets and scheduling duplicate delete operations 554.4. In some embodiments, as described above with regard to allocation engine 550, elimination logic 554.5.2 may use performance tier allocations of individual data units to select target data units for deletion.

Duplicate delete operations 554.4 may use storage manager 540 to initiate delete processes targeting duplicate host data units. For example, a delete operation may be added to a storage command processing queue as if a delete command had been received from the host. In some embodiments, storage device 500 may execute duplicate delete operations 554.4 as a result of deduplication operations executed by deduplication engine 554 without further intervention from the host. In some embodiments, host data units identified for duplicate delete operation 554.4 may be reported to the host and may include a delay and/or require confirmation from the host prior to executing duplicate delete operation 554.4.

ECC engine 560 may include an interface and set of functions, parameters, and data structures for storing, reading, and otherwise managing data ECC encoded by storage device 500, such as erasure encoded data blocks stored in non-volatile memory 520. For example, ECC engine 360 may include functions for encoding a host data block into a storage device ECC encoded data block and decoding a storage device ECC encoded data block back into the original host data symbol. In some embodiments, ECC engine 560 may be included in the write path and/or read path for non-volatile memory 520 that is managed by storage manager 540. In some embodiments, the encoding and decoding functions may be placed in separate encoding engines and decoding engines with redundant and/or shared functions where similar functions are used by both encoding and decoding operations.

Erasure coding configuration may include functions, parameters, and/or logic for determining the operations used to encode and decode those host data blocks in accordance with a storage device ECC configuration. For example, various ECC coding algorithms exist for providing forward error correction based on transforming a message of a certain number of symbols into a longer message of more symbols such that the original message can be recovered from a subset of the encoded symbols and related parity data. In some embodiments, a message may be split into a fixed number of symbols and these symbols are used as input for ECC coding. The ECC coding algorithm may generate a fixed amount of additional parity data or parity symbols. The sum of these symbols may then be stored to one or more storage locations. ECC engine 560 may be configured with at least one ECC coding algorithm using a set of coding parameters. For example, coding algorithms may enable selection of an algorithm type, such as parity-based, low-density parity-check codes, Reed-Solomon codes, etc., and one or more coding parameters, such as number of original symbols, number of encoded symbols, code rate, reception efficiency, parity level, etc. ECC engine 560 may include hardware and/or software encoders and decoders for implementing error coding. For example, ECC engine 560 may include a plurality of register-based encoders and decoders for calculating parity for a symbol and returning ECC encoded data symbols.

Figure 6:
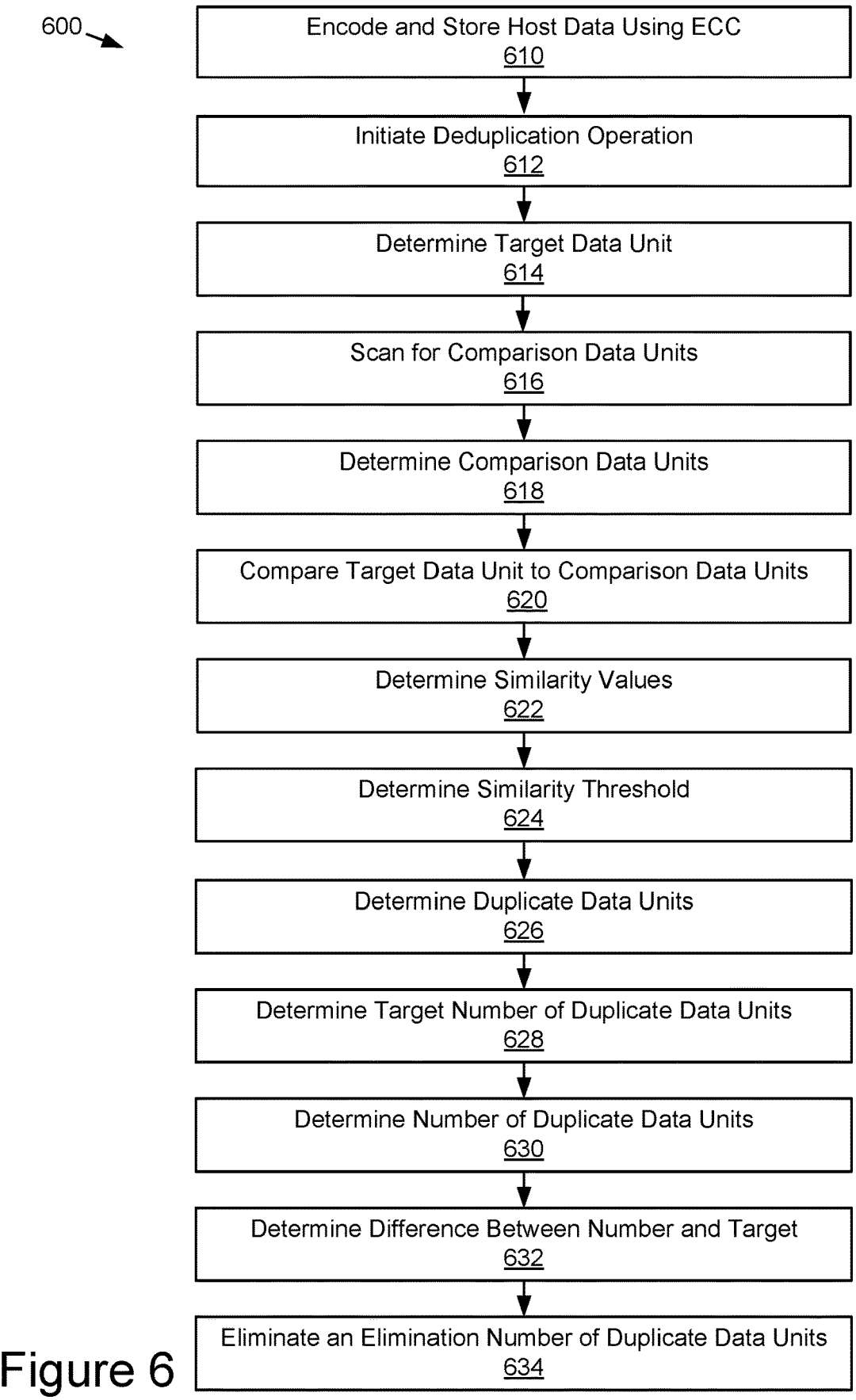
FIG. 6 is a flowchart of an example method of deduplication using in-device comparison of encoded host data.

As shown in FIG. 6, storage device 500 may be operated according to an example method for deduplication using in-device comparison of encoded host data, i.e. according to method 600 illustrated by blocks 610-634 in FIG. 6.

At block 610, host data from a host device may be encoded and stored using storage device ECC. For example, a host interface may receive read, write, and delete commands from the host device to manipulate host data stored by the storage device, where the storage device encodes data stored to its storage medium for write commands and decodes data stored on its storage medium for read commands.

At block 612, a deduplication operation may be initiated. For example, a deduplication engine may be initiated by a storage manager in response to host commands and/or internal trigger conditions for performing a duplicate identification for one or more host data units.

At block 614, a target data unit may be determined. For example, the deduplication engine may receive or determine a host data unit to be compared against other host data units to identify duplicates.

At block 616, host data may be scanned for comparison data units. For example, the deduplication engine may use parameters from the target data unit to determine a set of previously stored host data units that are possible duplicates of the target data unit, such as by querying or processing host metadata.

At block 618, a set of comparison data units may be determined. For example, the deduplication engine may determine a set of host data units at block 618 to be compared to the target data unit.

At block 620, the target data unit may be compared to each of the comparison data units. For example, the deduplication engine may compare each bit of the encoded target data unit to each bit of a comparison data unit to determine which bit are equal and which bits are unequal.

At block 622, similarity values may be determined for each comparison data unit. For example, the deduplication engine may sum the number of unequal bits to determine a similarity value.

At block 624, a similarity threshold may be determined. For example, the deduplication engine may receive a configuration parameter for the similarity threshold and/or determine the similarity threshold based on a dynamic parameter, such as a bit error rate corresponding to the storage medium or comparison data unit.

At block 626, duplicate data units may be determined. For example, the deduplication engine may compare the similarity values to the similarity threshold and comparison data units with similarity values below or meeting the similarity threshold may be determined to be duplicates of the target data unit.

At block 628, a target number of duplicate data units may be determined. For example, the deduplication engine may be configured with a number of allowable duplicates and/or include an algorithm or set of rules for dynamically determining the number of allowable duplicates for a particular host data unit.

At block 630, a number of duplicate data units may be determined. For example, the deduplication engine may determine a count of the duplicate data units determined at block 626.

At block 632, a difference between the number of duplicate data units and the target number may be determined. For example, the deduplication engine may subtract the target number from the actual number of duplicate data units for the host data unit and a positive result may indicate an elimination number of duplicate data units that exceed the target number.

At block 634, the elimination number of duplicate data units may be eliminated. For example, the deduplication engine may initiate delete operations targeting duplicate data units equal to the elimination number.

Figure 7:
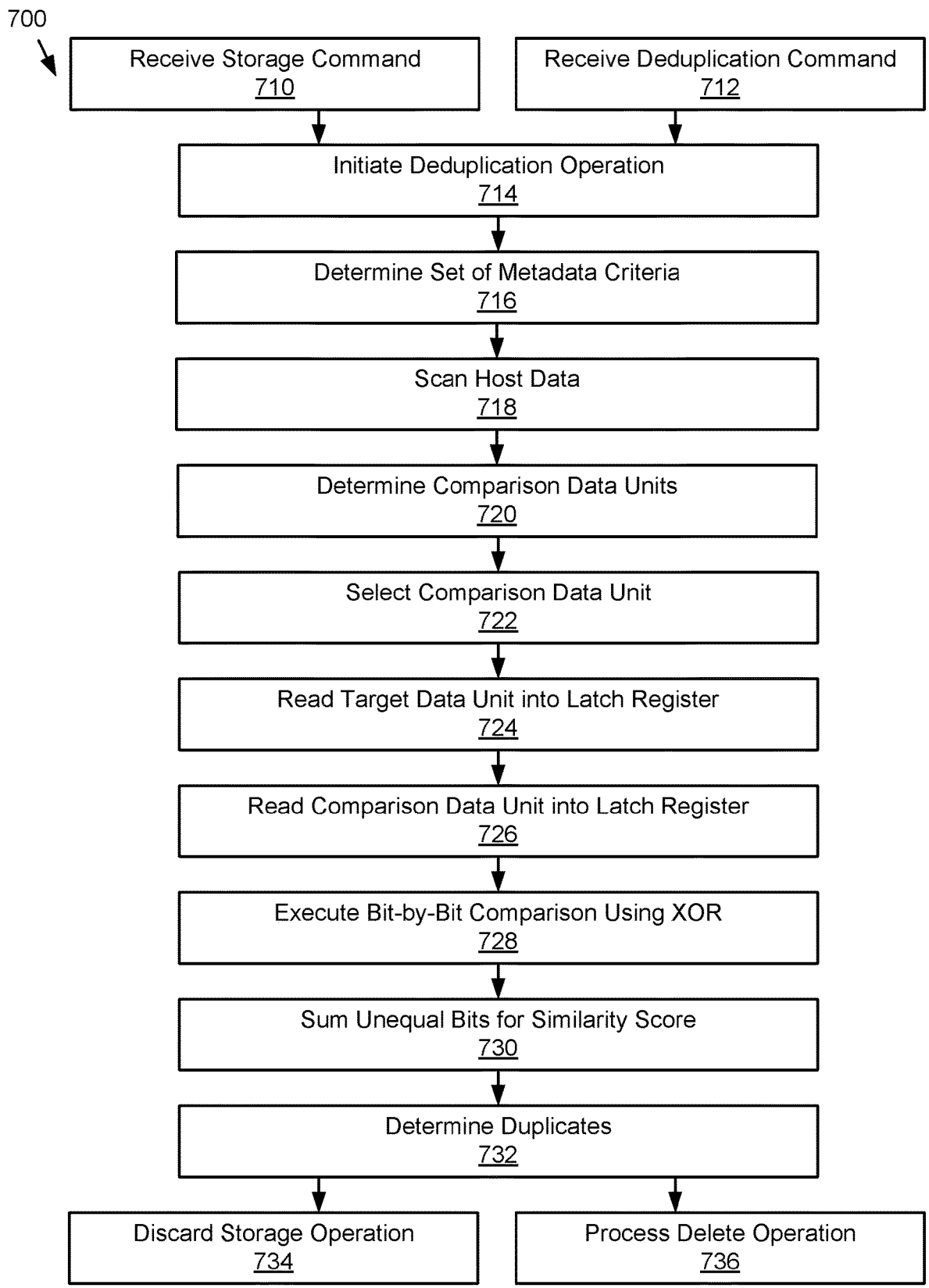
FIG. 7 is a flowchart of another example method of deduplication using in-device comparison of encoded host data.

As shown in FIG. 7, storage device 500 may be operated according to an example method for deduplication using in-device comparison of encoded host data, i.e. according to method 700 illustrated by blocks 710-736 in FIG. 7. In some embodiments, one or more blocks of method 700 may be used in conjunction with method 600 in FIG. 6.

At block 710, a storage command may be received. For example, a host interface may receive a read, write, or delete command that includes a deduplication parameter.

At block 712, a deduplication command may be received. For example, the host interface may receive a deduplication command that identifies one or more host data units to be deduplicated.

At block 714, a deduplication operation may be initiated. For example, a deduplication engine may be initiated responsive to the storage command at block 710 or the deduplication command at block 712.

At block 716, a set of metadata criteria may be determined. For example, the deduplication engine may determine a set of metadata parameters and values based on a target date unit from the command and/or parameters included with the command.

At block 718, host data may be scanned. For example, the deduplication engine may use the metadata parameter values to scan host data through a host metadata datastore or data structure.

At block 720, a set of comparison data units may be determined. For example, the deduplication engine may determine a set of host data units at block 718 to be compared to the target data unit.

At block 722, a comparison data unit may be selected from the set of comparison data units. For example, the deduplication engine may include logic for executing comparisons against each of the comparison data units in the set by randomly or sequentially selecting comparison data units from the set.

At block 724, the target data unit may be read into a latch register. For example, the deduplication engine may read the encoded target data unit from the storage medium to a latch layer 1 set of registers.

At block 726, the comparison data unit may be read into a latch register. For example, the deduplication engine may read the encoded comparison data unit from the storage medium to a latch layer 2 set of registers.

At block 728, a bit-by-bit comparison of the data units may be executed using exclusive-or logic. For example, the deduplication engine may compare the bits in latch layer 1 with their corresponding or paired bit in latch layer 2 to compare whether or not the bits are equal.

At block 730, unequal bits may be summed for a similarity score. For example, each unequal bit pair may generate a count and the deduplication engine may sum the counts for the similarity score.

At block 732, duplicates may be determined. For example, the deduplication engine may compare the similarity score against a similarity threshold and comparison data units under or meeting the similarity threshold may be included in a set of duplicate data units.

At block 734, a duplicate storage operation may be discarded. For example, a storage manager may discard a write operation for a duplicate data unit from the command processing queue rather than completing it.

At block 736, a delete operation may be processed. For example, the storage manager may generate and process delete operations to eliminate one or more duplicate data units.

Figure 8:
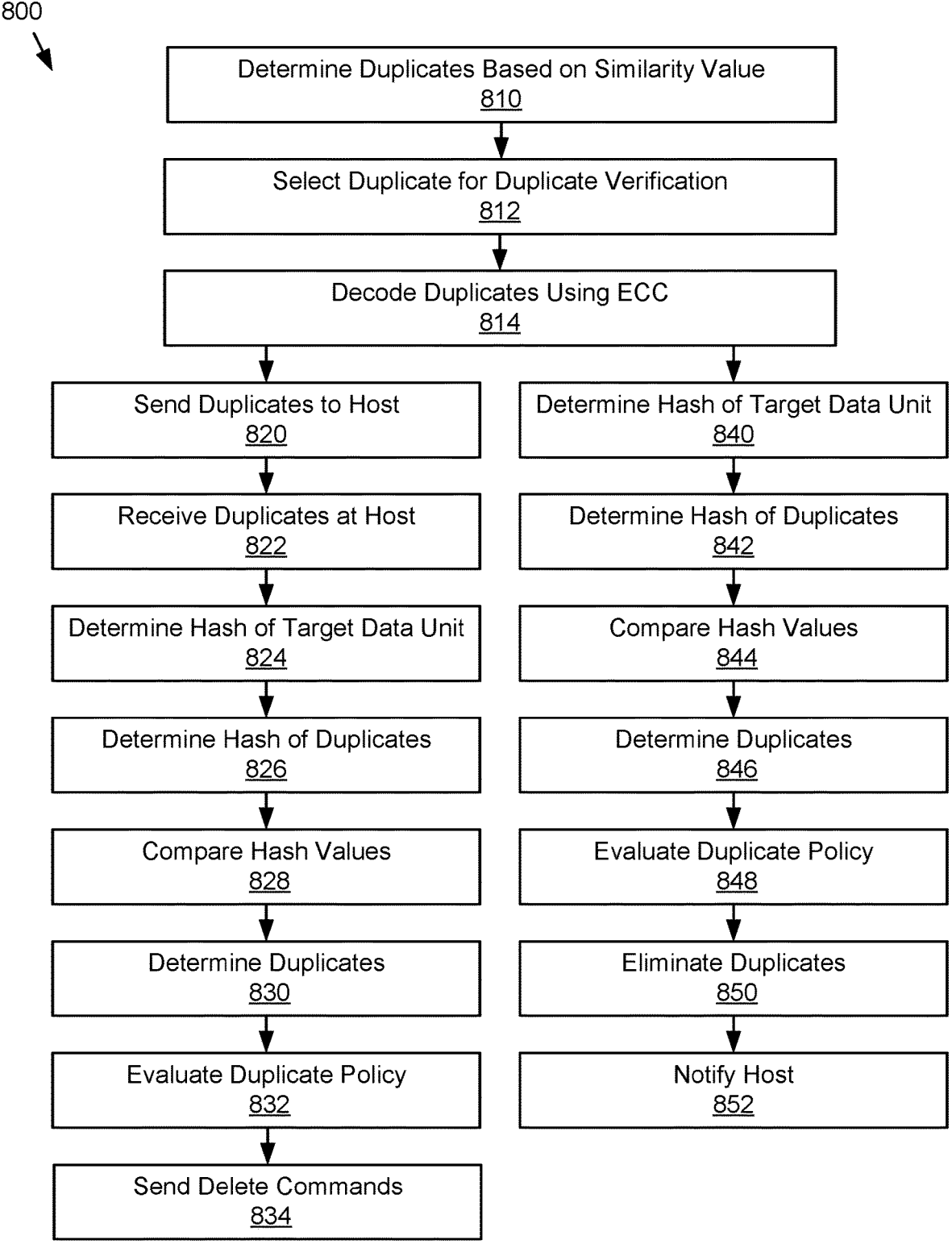
FIG. 8 is a flowchart of an example method of duplicate verification to support in-device comparison of encoded host data.

As shown in FIG. 8, storage system 300 and/or storage device 500 may be operated according to an example method for duplicate verification to support in-device comparison of encoded host data, i.e. according to method 800 illustrated by blocks 810-852 in FIG. 8. In some embodiments, one or more blocks of method 800 may be used in conjunction with method 600 in FIG. 6 and/or method 700 in FIG. 7.

At block 810, duplicates may be determined based on a similarity value. For example, a deduplication engine in a storage device may determine duplicates based on similarity values calculated from comparing encoded host data.

At block 812, at least one duplicate may be selected for duplicate verification. For example, the deduplication engine may be configured to identify duplicates for elimination and verify those duplicates prior to elimination.

At block 814, duplicate host data may be decided using ECC. For example, the storage manager may decode the selected duplicate host data using storage device ECC in a read process similar to normal read operation processing.

Blocks 820-836 may represent storage device 120 and/or 500 offloading duplicate verification to a host device 102. Blocks 840-854 may represent storage device 500 conducting duplicate verification internally.

At block 820, duplicate data units may be sent to the host. For example, the deduplication engine may initiate host interface to send the duplicate host data units to the host system for further deduplication processing.

At block 822, the host may receive the duplicate data units. For example, the host device may receive the duplicate data units in response to one or more commands that initiated the deduplication process or responsive to a background deduplication process in the storage device.

At block 824, a hash value of the target data unit may be determined. For example, the host may process the target data unit using a hashing algorithm to generate a hash value for the target data unit.

At block 826, a hash value may be determined for each duplicate data unit. For example, the host may process the duplicate data units using the same hashing algorithm to generate hash values for each duplicate data unit.

At block 828, the hash values may be compared. For example, the host may compare the target data unit hash value to the duplicate data unit hash value to determine whether or not they match.

At block 830, duplicates may be determined or verified. For example, the host may determine that only duplicate data units with matching hash values to the target data unit hash value are duplicates to be handled according to the duplicate policy of the host device.

At block 832, a duplicate policy may be evaluated. For example, the host may evaluate a duplicate policy to determine whether one or more verified duplicates exceed the number of duplicates allowed under the duplicate policy.

At block 834, delete commands may be sent. For example, the host may generate and send delete commands for any duplicate data units that should be eliminated under the duplicate policy.

At block 840, a hash value of the target data unit may be determined. For example, the deduplication engine in the storage device may process the target data unit using a hashing algorithm to generate a hash value for the target data unit.

At block 842, a hash value may be determined for each duplicate data unit. For example, the deduplication engine may process the duplicate data units using the same hashing algorithm to generate hash values for each duplicate data unit.

At block 844, the hash values may be compared. For example, the deduplication engine may compare the target data unit hash value to the duplicate data unit hash value to determine whether or not they match.

At block 846, duplicates may be determined or verified. For example, the deduplication engine may determine that only duplicate data units with matching hash values to the target data unit hash value are duplicates to be handled according to the duplicate policy of the host device and/or storage device (as defined in the deduplication configuration).

At block 848, a duplicate policy may be evaluated. For example, the deduplication engine may evaluate a duplicate policy to determine whether one or more verified duplicates exceed the number of duplicates allowed under the duplicate policy.

At block 850, one or more duplicate data units may be eliminated. For example, the deduplication engine may generate and process delete operations for any duplicate data units that should be eliminated under the duplicate policy.

At block 852, a notification may be sent to the host. For example, the storage device may generate a response message and/or notification message based on the deduplication operation and any resulting deletions.

Figure 9:
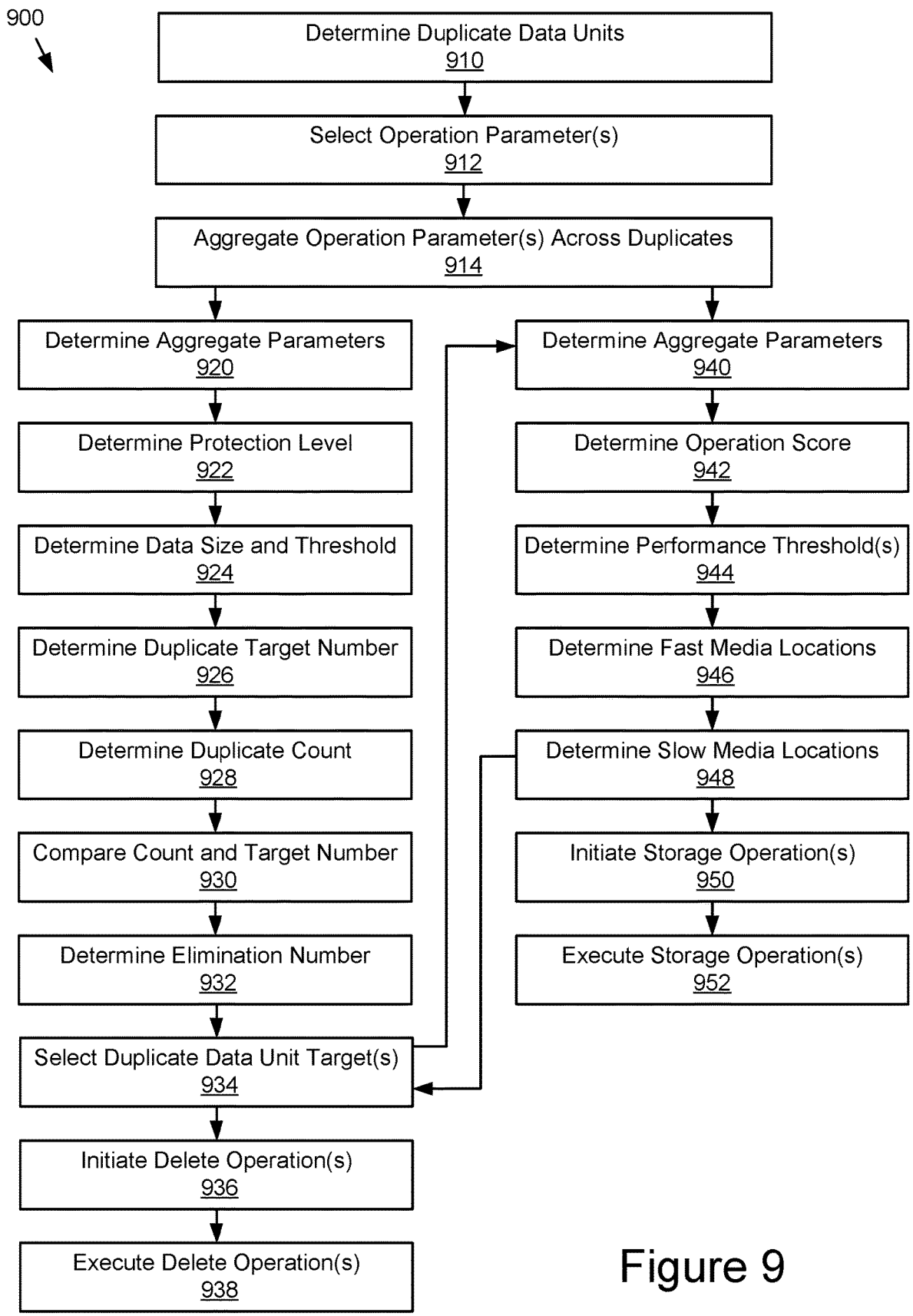
FIG. 9 is a flowchart of an example method of duplicate management using aggregate operation parameters.

As shown in FIG. 9, storage device 500 and/or storage systems 100, 200, and/or 300 may be operated according to an example method for duplicate management using aggregate operation parameters, i.e. according to method 900 illustrated by blocks 910-952 in FIG. 9.

At block 910, duplicate data units may be determined. For example, a duplicate checker and/or deduplication engine may determine a duplicate set of host data units with sufficient similarity to be equivalent data.

At block 912, operation parameters may be selected. For example, a performance monitor may select one or more operation parameters, such as operation type, operation sources, and/or operation times.

At block 914, operation parameters may be aggregated across the data units in the duplicate set. For example, the performance monitor may aggregate each selected parameter from each data unit to determine an aggregate operation parameter, such as by summing, statistical analysis, minimum or maximum value, etc.

At block 920, aggregate parameters may be determined. For example, responsive to a deduplication operation, a duplicate rules engine may be configured to use a selected set of aggregate parameters, including aggregate operation parameters, for determining a duplicate target number.

At block 922, a protection level may be determined. For example, a operation parameter selected by the duplicate rules engine may include a protection level value (average, maximum, etc.) for the duplicate set.

At block 924, a data unit size and data size threshold may be determined. For example, the duplicate rules engine may determine the data unit size of individual data units and/or the aggregate size of all data units in the duplicate set and a size threshold for contributing to the duplicate target number determination.

At block 926, a duplicate target number may be determined. For example, the duplicate rules engine may evaluate an algorithm or set of logical rules for determining the duplicate target number from the selected aggregate parameters.

At block 928, a duplicate count may be determined. For example, the duplicate checker and/or deduplication engine may have determined the number of data units in the duplicate set and provided that duplicate count value to the duplicate rules engine.

At block 930, the duplicate count may be compared to the duplicate target number. For example, the duplicate rules engine may subtract the duplicate target number from the duplicate count value.

At block 932, an elimination number may be determined. For example, the duplicate rules engine may treat any positive remainder from the comparison at block 930 as an elimination number, the number of duplicate data units to be eliminated.

At block 934, duplicate data units may be selected as targets for deletion. For example, the duplicate rules engine may include elimination logic for determining the targets of any resulting delete operations. In some embodiments, the duplicate rules engine may use performance tier parameters determined at blocks 940-948 for determining which data units to target.

At block 936, one or more delete operations may be initiated. For example, the deduplication engine may generate delete operations targeting the data units selected at block 934.

At block 938, the delete operations may be executed. For example, the storage manager in the storage device associated with the storage medium storing the target data units may process the delete operations.

At block 940, aggregate parameters may be determined. For example, responsive to a performance tiering operation, an allocation engine may be configured to use a selected set of aggregate parameters, including aggregate operation parameters, for determining an operation score.

At block 942, an operation score may be determined. For example, the allocation engine may evaluate an algorithm or set of logical rules for determining the operation score from the selected aggregate parameters.

At block 944, one or more performance thresholds may be determined. For example, the allocation engine may include performance thresholds defining two or more performance tiers.

At block 946, fast media locations may be determined. For example, the allocation engine may compare the operation score to a hot data performance threshold and, responsive to meeting or exceeding the hot data performance threshold, select a fast media storage location for the storage operation.

At block 948, slow media locations may be determined. For example, the allocation engine may compare the operation score to the hot data performance threshold and, responsive to not meeting the hot data performance threshold, select a slow media storage location for the storage operation.

At block 950, the storage operation may be initiated. For example, the appropriate storage location may be passed to a read/write processor for completing the storage operation.

At block 952, the storage operation may be executed. For example, the host data unit may be written to and/or read from the determined media location for the performance tier.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system comprising:
 a controller, comprising a processor and a memory, and configured to:
  determine a plurality of duplicate data units corresponding to a target data unit in a plurality of storage media;
  determine a duplicate set identifier for the plurality of duplicate data units;
  store a duplicate set entry corresponding to the duplicate set identifier and unique identifiers for the plurality of duplicate data units;
  determine and store, in the duplicate set entry, a duplicate count of the plurality of duplicate data units;
  aggregate and store, in the duplicate set entry, at least one operation parameter for the plurality of duplicate data units to determine at least one aggregate operation parameter, wherein the controller aggregates the at least one operation parameter for the plurality of duplicate data units by traversing an operation log based on the unique identifiers for the plurality of duplicate data units;
  determine, based on the at least one aggregate operation parameter, a duplicate target number for the duplicate set identifier;
  determine, based on the at least one aggregate operation parameter, an operation score for the duplicate set identifier;

determine at least one performance threshold for distinguishing among the plurality of storage media; and allocate, based on a comparison of the duplicate count to the duplication target number and a comparison of the operation score to the at least one performance threshold, a storage operation for the target data unit to a storage location in the plurality of storage media.

2. The system of claim 1, wherein the controller is further configured to:

initiate, responsive to the duplicate count exceeding the duplicate target number, a delete operation targeting at least one duplicate data unit from the plurality of duplicate data units.

3. The system of claim 1, wherein:

the at least one aggregate operation parameter includes a plurality of aggregate operation parameters;

the plurality of aggregate operation parameters includes aggregate operation parameters selected from:
a number of users of the plurality of duplicate data units;
a number of read operations targeting the plurality of duplicate data units in a performance period;
a number of write operations for the plurality of duplicate data units in the performance period; and
a latency value for storage operations targeting the plurality of duplicate data units in the performance period; and the controller is further configured to:
determine the plurality of aggregate operation parameters; and
store the plurality of aggregate operation parameters in the duplicate set entry.

4. The system of claim 1, wherein:

the duplicate target number is further based on a protection level assigned to the duplicate set identifier from a plurality of protection levels; and the controller is further configured to:
determine the protection level assigned to the duplicate set identifier; and
store the protection level in the duplicate set entry.

5. The system of claim 1, wherein:

the duplicate target number is further based on a comparison of a size of the target data unit and at least one size threshold; and the controller is further configured to:
determine the size of the target data unit;
store the size of the target data unit in the duplicate set entry; and
determine the at least one size threshold.

6. The system of claim 2, further comprising a storage device, wherein:

the storage device comprises:
the controller; and
the plurality of storage media; and the controller is further configured to:
scan the plurality of storage media to determine the plurality of duplicates; and
execute the delete operation targeting at least one duplicate data unit from the plurality of duplicate data units.

7. The system of claim 6, wherein the controller is further configured to:

encode, using an error correction code, host data units stored in the plurality of storage media;

compare an encoded target data unit corresponding to the target data unit to a plurality of encoded comparison data units from the plurality of storage media; and determine, based on the comparison of the encoded target data unit and the plurality of encoded comparison data units, the plurality of duplicates and the duplicate count.

8. The system of claim 2, wherein:

the plurality of storage media includes:
a fast storage media device; and
a slow storage media device;

the fast storage media device has a greater storage operation per unit time value than the slow storage media device;

the at least one performance threshold includes a slow storage performance threshold; and the controller is further configured to:
target, based on the operation score meeting the slow storage performance threshold, at least one duplicate data unit in the slow storage media device for the delete operation; and
target, based on the operation score not meeting the slow storage performance threshold, at least one duplicate data unit in the fast storage media device for the delete operation.

9. The system of claim 1, wherein:

the plurality of storage media includes:
a fast storage media device; and
a slow storage media device;

the fast storage media device has a greater storage operation per unit time value than the slow storage media device;

the at least one performance threshold includes a fast storage performance threshold; and the controller is further configured to:
determine, based on the operation score meeting the fast storage performance threshold, the storage location in the fast storage media device for the storage operation; and
determine, based on the operation score not meeting the fast storage performance threshold, the storage location in the slow storage media device for the storage operation.

10. The system of claim 1, wherein:

the at least one aggregate operation parameter includes a plurality of aggregate operation parameters;

the controller is further configured to determine the plurality of aggregate operation parameters; and determining the duplicate target number comprises evaluating a duplicate target algorithm configured to combine the plurality of aggregate operation parameters with weighting factors and a mapping function.

11. The system of claim 9, further comprising:

a host device comprising the controller;
a first storage device comprising the fast storage media device; and
a second storage device comprising the slow storage media device.

12. A computer-implemented method, comprising:

determining a plurality of duplicate data units corresponding to a target data unit in a plurality of storage media;

determining a duplicate set identifier for the plurality of duplicate data units;

storing a duplicate set entry corresponding to the duplicate set identifier and unique identifiers for the plurality of duplicate data units;

determining and storing, in the duplicate set entry, a duplicate count of the plurality of duplicate data units;

aggregating and storing, in the duplicate set entry, at least one operation parameter for the plurality of duplicate data units to determine at least one aggregate operation parameter, wherein aggregating the at least one operation parameter for the plurality of duplicate data units includes traversing an operation log based on the unique identifiers for the plurality of duplicate data units;

determining, based on the at least one aggregate operation parameter, a duplicate target number for the duplicate set identifier;

determining, based on the at least one aggregate operation parameter, an operation score for the duplicate set identifier;

determining at least one performance threshold for distinguishing among the plurality of storage media; and allocating, based on a comparison of the duplicate count to the duplication target number and a comparison of the operation score to the at least one performance threshold, a storage operation for the target data unit to a storage location in the plurality of storage media.

13. The computer-implemented method of claim 12, further comprising:
initiating, responsive to the duplicate count exceeding the duplicate target number, a delete operation targeting at least one duplicate data unit from the plurality of duplicate data units.

14. The computer-implemented method of claim 12, further comprising:
determining a plurality of aggregate operation parameters, wherein:
the at least one aggregate operation parameter includes the plurality of aggregate operation parameters; and
the plurality of aggregate operation parameters includes aggregate operation parameters selected from:
a number of users of the plurality of duplicate data units;
a number of read operations targeting the plurality of duplicate data units in a performance period;
a number of write operations for the plurality of duplicate data units in the performance period; and
a latency value for storage operations targeting the plurality of duplicate data units in the performance period; and
storing the plurality of aggregate operation parameters in the duplicate set entry.

15. The computer-implemented method of claim 12, further comprising:
determining a protection level assigned to the duplicate set identifier from a plurality of protection levels, wherein the duplicate target number is further based on the protection level; and
storing the protection level in the duplicate set entry.

16. The computer-implemented method of claim 12, further comprising:
determining a size of the target data unit;
storing the size of the target data unit in the duplicate set entry; and
determining at least one size threshold, wherein the duplicate target number is further based on a comparison of the size of the target data unit and the at least one size threshold.

17. The computer-implemented method of claim 13, further comprising:

comparing the operation score to a slow storage performance threshold, wherein:
the at least one performance threshold includes the slow storage performance threshold;
the plurality of storage media includes:
a fast storage media device; and
a slow storage media device; and
the fast storage media device has a greater storage operation per unit time value than the slow storage media device;
targeting, based on the operation score meeting the slow storage performance threshold, at least one duplicate data unit in the slow storage media device for the delete operation; and
targeting, based on the operation score not meeting the slow storage performance threshold, at least one duplicate data unit in the fast storage media device for the delete operation.

18. The computer-implemented method of claim 12, further comprising:
comparing the operation score to a fast storage performance threshold, wherein:
the at least one performance threshold includes the fast storage performance threshold;
the plurality of storage media includes:
a fast storage media device; and
a slow storage media device; and
the fast storage media device has a greater storage operation per unit time value than the slow storage media device;
determining, based on the operation score meeting the fast storage performance threshold, the storage location in the fast storage media device for the storage operation; and
determining, based on the operation score not meeting the fast storage performance threshold, the storage location in the slow storage media device for the storage operation.

19. The computer-implemented method of claim 12, wherein:
the at least one aggregate operation parameter includes a plurality of aggregate operation parameters; and
determining the duplicate target number comprises evaluating a duplicate target algorithm configured to combine the plurality of aggregate operation parameters with weighting factors and a mapping function.

20. A storage device, comprising:
a storage medium configured to store host data;
a storage device controller comprising:
a processor; and
an operating memory;
means, stored in the operating memory for execution by the processor, for determining a plurality of duplicate data units corresponding to a target data unit in a plurality of storage media;
means, stored in the operating memory for execution by the processor, for determining a duplicate set identifier for the plurality of duplicate data units;
means, stored in the operating memory for execution by the processor, for storing a duplicate set entry corresponding to the duplicate set identifier and unique identifiers for the plurality of duplicate data units;
means, stored in the operating memory for execution by the processor, for determining a duplicate count of the plurality of duplicate data units;
means, stored in the operating memory for execution by the processor, for aggregating at least one operation parameter for the plurality of duplicate data units to determine at least one aggregate operation parameter, wherein aggregating the at least one operation parameter for the plurality of duplicate data units includes traversing an operation log based on the unique identifiers for the plurality of duplicate data units;

means, stored in the operating memory for execution by the processor, for determining, based on the at least one aggregate operation parameter, a duplicate target number for the duplicate set identifier;

means, stored in the operating memory for execution by the processor, for determining, based on the at least one aggregate operation parameter, an operation score for the duplicate set identifier;

means, stored in the operating memory for execution by the processor, for determining at least one performance threshold for distinguishing among the plurality of storage media; and means, stored in the operating memory for execution by the processor, for allocating, based on a comparison of the duplicate count to the duplication target number and a comparison of the operation score to the at least one performance threshold, a storage operation for the target data unit to a storage location in the plurality of storage media.

* * * * *